(12) United States Patent
Ueno et al.

(10) Patent No.: US 6,763,655 B2
(45) Date of Patent: Jul. 20, 2004

(54) CATALYST STATE DETECTOR FOR EXHAUST GAS PURIFYING CATALYST

(75) Inventors: Masaki Ueno, Saitama-ken (JP); Shusuke Akazaki, Saitama-ken (JP); Masahiro Sato, Saitama-ken (JP); Hideharu Yamazaki, Saitama-ken (JP); Tetsuo Endo, Saitama-ken (JP); Yoshihisa Iwaki, Saitama-ken (JP); Takashi Haga, Saitama-ken (JP); Tadashi Sato, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 448 days.

(21) Appl. No.: 09/797,995

(22) Filed: Mar. 5, 2001

(65) Prior Publication Data

US 2001/0025484 A1 Oct. 4, 2001

(30) Foreign Application Priority Data

Mar. 10, 2000 (JP) ........................ 2000-066443
Nov. 6, 2000 (JP) ........................ 2000-338375

(51) Int. Cl.$^7$ ................................. F01N 3/00
(52) U.S. Cl. ............................ 60/277; 60/276; 60/285; 60/287; 60/297
(58) Field of Search .................... 60/276, 277, 278, 60/287, 288, 289, 291, 292, 295, 297, 299

(56) References Cited

U.S. PATENT DOCUMENTS

| | | | |
|---|---|---|---|
| 5,595,060 A | * | 1/1997 | Togai et al. ............... 60/274 |
| 5,713,198 A | | 2/1998 | Aoki et al. |
| 6,357,227 B1 | * | 3/2002 | Neufert ..................... 60/309 |
| 6,422,006 B2 | * | 7/2002 | Ohmori et al. ............ 60/297 |
| 6,477,830 B2 | * | 11/2002 | Takakura et al. ........... 60/277 |
| 6,581,370 B2 | * | 6/2003 | Sato et al. ................. 60/277 |

FOREIGN PATENT DOCUMENTS

| | | | | |
|---|---|---|---|---|
| DE | 35 17 481 | | 11/1986 | |
| DE | 198 06 880 | | 8/1999 | |
| EP | 0 782 880 | | 7/1997 | |
| JP | 405256124 A | * | 10/1993 | ............ 60/287 |

* cited by examiner

*Primary Examiner*—Binh Tran
(74) *Attorney, Agent, or Firm*—Arent Fox, PLLC

(57) ABSTRACT

A catalyst state detector for detecting a state of an exhaust gas purifying catalyst which is capable of accurately detecting the state, including deterioration, of an HC adsorbent contained in the exhaust gas purifying catalyst for adsorbing hydrocarbons in exhaust gases of an internal combustion engine, and can be manufactured at a low cost. The exhaust gas purifying catalyst is arranged at an intermediate portion of an exhaust pipe, and the HC adsorbent is capable of adsorbing hydrocarbons and moisture in exhaust gases. The catalyst state detector comprises a downstream humidity sensor arranged at a location downstream of the HC adsorbent in the exhaust pipe for detecting a humidity of the exhaust gases, and an adsorbent state detecting unit (ECU) for detecting the state of the HC adsorbent in accordance with the result of detection made by the downstream humidity sensor.

9 Claims, 20 Drawing Sheets

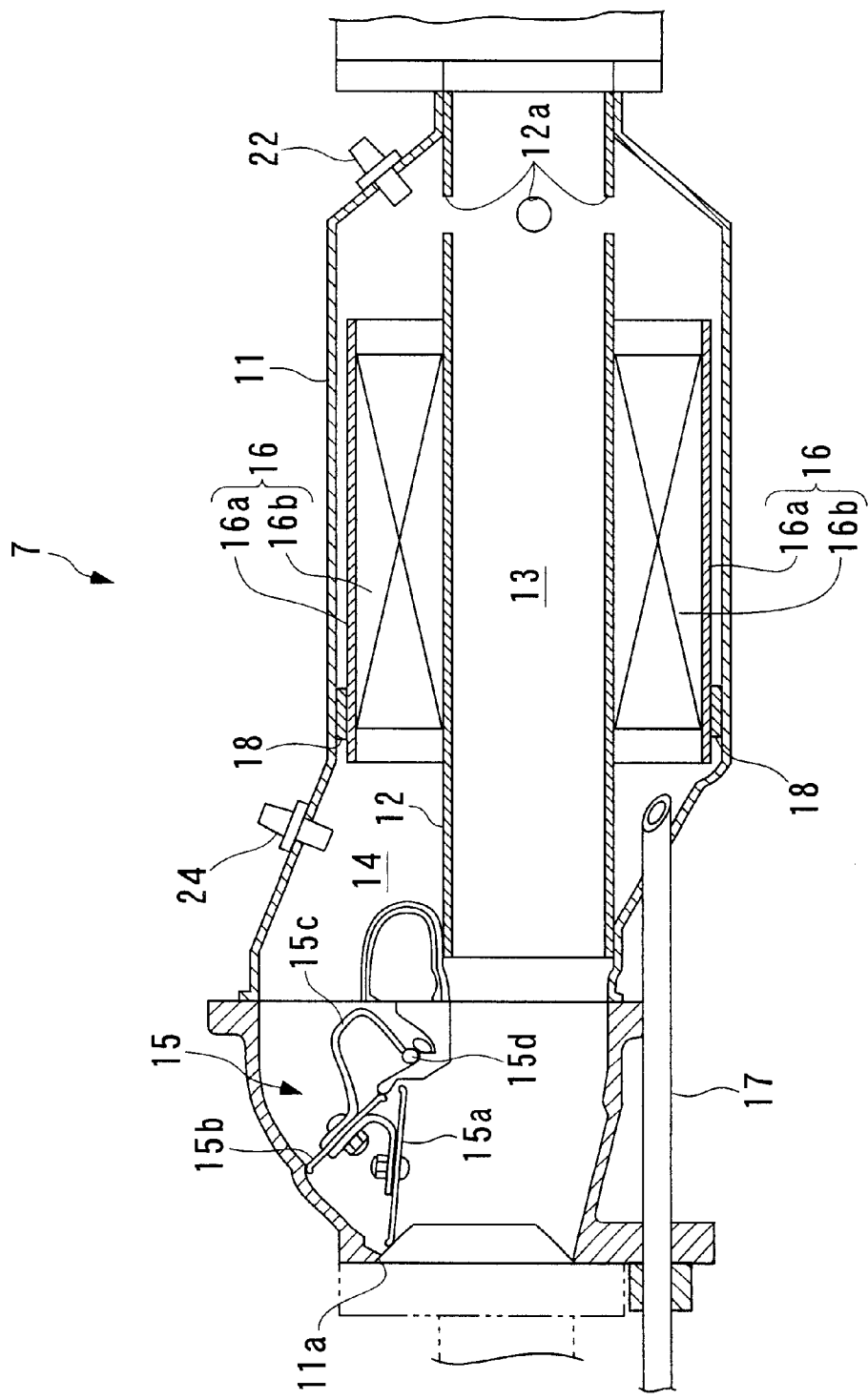

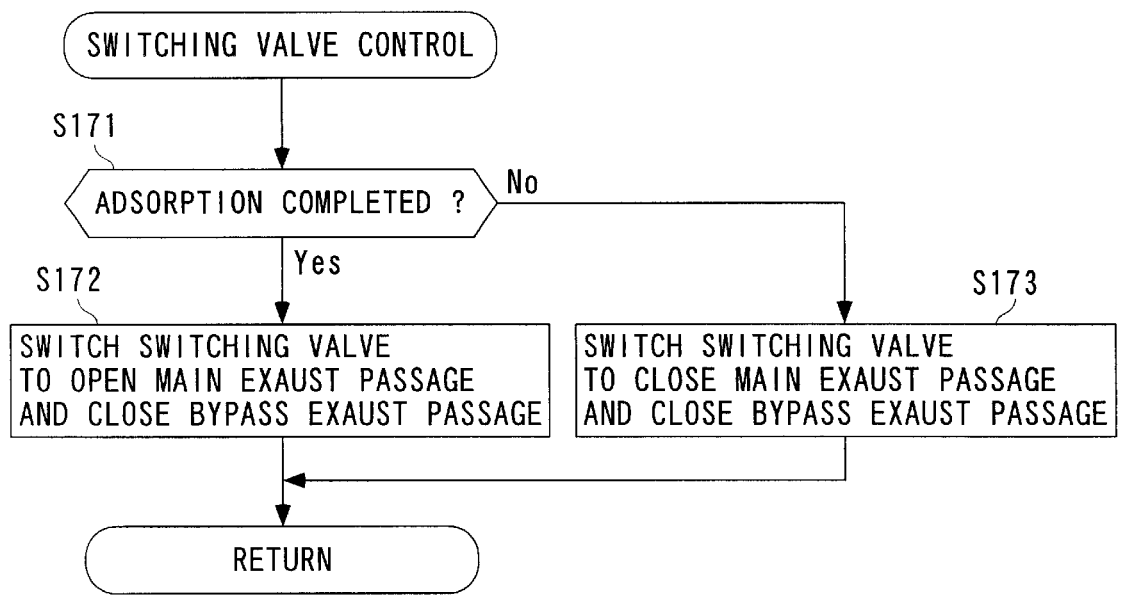
F I G. 2 1

CATALYST STATE DETECTOR FOR EXHAUST GAS PURIFYING CATALYST

BACKGROUND OF THE INVENTION

1. Field of the Invention

The present invention relates to a catalyst state detector for an exhaust gas purifying catalyst which purifies exhaust gases emitted from an internal combustion engine, and more particularly, to a catalyst state detector for an exhaust gas purifying catalyst which purifies exhaust gases using an adsorbent for adsorbing hydrocarbons in exhaust gases.

2. Description of the Prior Art

Generally, in an exhaust system of a gasoline engine or the like, a three-way catalyst is arranged in an intermediate portion of an exhaust pipe in order to purify harmful substances (hydrocarbons, carbon monoxide and nitrogen compounds) in exhaust gases, the amount of which cannot be reduced sufficiently by engine modifications or EGR (exhaust gas recirculation). The three-way catalyst is heated by exhaust gases or by using additional means, and activated at temperatures equal to or higher than a predetermined temperature (300° C., for example), thereby purifying harmful substances flowing through the exhaust pipe by oxidation-reduction catalyst actions thereof. However, for approximately 30 to 40 seconds after the cold start of the engine, the temperature of the three-way catalyst is lower than the predetermined temperature, and the catalyst remains inactive, so that among the harmful substance, particularly hydrocarbons are emitted from the engine as they are as unburned combustible components. Therefore, in order to prevent emission of hydrocarbons in the air, there has been proposed an engine which incorporates not only the three-way catalyst but also an adsorbent, which is capable of adsorbing hydrocarbons, in an exhaust pipe of the engine (see, for example, Laid-open Japanese Patent Application No. 10-153112).

Such an adsorbent is arranged in a bypass exhaust passage branched from a main exhaust passage in which a three-way catalyst is arranged in exhaust pipes. When the three-way catalyst is not activated, for example, upon starting the engine, exhaust gases are introduced into the bypass exhaust passage such that hydrocarbons in the exhaust gases are adsorbed by the adsorbent. On the other hand, after the three-way catalyst is activated by worm-up of the engine, the exhaust gases are introduced into the main exhaust passage such that the exhaust gases are purified by the three-way catalyst. The adsorbent has, for example, zeolite on its surface, so that when the exhaust gases are passing through the bypass exhaust passage, molecules of hydrocarbons are caused to enter small pores of the zeolite, and the hydrocarbons are adsorbed. Also, when such an adsorbent is heated to a temperature equal to or higher than a predetermined temperature (for example, 100 to 250° C.) by the exhaust gases, the adsorbent desorbs hydrocarbons once adsorbed thereby. Then, the desorbed hydrocarbons are recirculated to the engine through an EGR pipe or the like.

As described above, while adsorption and desorption of hydrocarbons are repeated in the adsorbent, the amount of undesorbed hydrocarbons remaining in the adsorbent may gradually increase or cause destruction of pores of the adsorbent during a long-term use of the adsorbent. As a result, the adsorbent is deteriorated, i.e., experiences a gradually deteriorated capability of adsorbing hydrocarbons. If the engine is repeatedly started in such a state, hydrocarbons unabsorbed by the adsorbent will be emitted into the air. For this reason, it is required to detect the deterioration of the adsorbent in order to carry out engine control for desorbing hydrocarbons (e.g., by elevating the temperature of the adsorbent) to solve the deterioration of the adsorbent, or to notify the driver of the deterioration of the adsorbent. Among such methods of detecting the deterioration of the adsorbent, there are, by way of example, (1) a method which relies on a hydrocarbon sensor for the detection, (2) a method which relies on temperature sensors for the detection, and so on.

According to the method (1) relying on a hydrocarbon sensor, the hydrocarbon sensor is arranged at a location downstream of the adsorbent in the bypath exhaust passage. Then, the concentrations of hydrocarbons in exhaust gases introduced into the bypass exhaust passage and passing through the adsorbent is directly detected by the hydrocarbon sensor. Then, the deterioration of the adsorbent is detected based on the result of the detection. Specifically, when the concentrations of hydrocarbons in the exhaust gases introduced into the bypass exhaust passage and passing at a location downstream of the adsorbent (hereinafter referred to as the "post-adsorption exhaust gases" in the disclosure), which is active in adsorbing hydrocarbons, exceed a predetermined value or a predetermined allowable range, it is determined that the adsorbent is no longer capable of sufficiently adsorbing hydrocarbons, i.e., in a deteriorated state. Conversely, when the concentrations of hydrocarbons in the post-adsorption exhaust gases are equal to or lower than the predetermined value or within the predetermined allowable range, it is determined that the adsorbent is still capable of properly adsorbing hydrocarbons, i.e., in an undeteriorated or normal state.

According to the method (2) relying on temperature sensors, on the other hand, the temperature sensors are arranged both at locations upstream and downstream of an adsorbent in a bypass exhaust passage, respectively, for example, as described in Laid-open Japanese Patent Application No. 6-229234. These sensors detect the temperatures of the exhaust gases at locations upstream and downstream of the adsorbent to calculate a time period during which moisture in the exhaust gases is in a dew point state (dew point time) based on the result of the detection. Then, the deterioration of the adsorbent is detected based on the resulting dew point time. More specifically, a predefined standard dew point time (standard dew point time) is calculated in accordance with the result of the detection by the upstream temperature sensor and an engine operating condition, and an actual dew point time (actual dew point time) is calculated based on the result of the detection by the downstream temperature sensor. Then, these dew point times are compared with each other to determine that the adsorbent is more deteriorated as the actual dew point time is shorter than the standard dew point time, and conversely to determine that the adsorbent is less deteriorated as the actual dew point time is longer than the standard dew point time.

The foregoing detecting methods suffer from the following problems, respectively. In the method (1) relying on a hydrocarbon sensor, a generally employed hydrocarbon sensor is limited to detection of the concentration of a particular hydrocarbon (one kind of hydrocarbon having a predetermined number of carbons), so that it is difficult to accurately detect as a whole the concentrations of various hydrocarbons respectively having different numbers of carbons by such a hydrocarbon sensor. It is further difficult to correctly detect the deterioration of the adsorbent based on the result of the detection. In addition, the hydrocarbon sensor itself is quite expensive as compared with other sensors.

In the method (2) relying on temperature sensors, on the other hand, the deterioration of the adsorbent is indirectly detected by detecting temperatures of exhaust gases at two different locations, causing a susceptibility to an error in the detection of deterioration and a low detection accuracy. In addition, temperature sensors are expensive as is the case of the hydrocarbon sensor, and the use of two temperature sensors further results in a higher cost of the exhaust system as a whole.

OBJECT AND SUMMARY OF THE INVENTION

The present invention has been made to solve the problems as mentioned above, and its object is to provide a catalyst state detector for an exhaust gas purifying catalyst, which is capable of accurately detecting a state of an adsorbent of the exhaust gas purifying catalyst for adsorbing hydrocarbons, including deterioration, and which can be manufactured at a low price.

To achieve the above object, the present invention provides a catalyst state detector for detecting a state of an adsorbent capable of adsorbing hydrocarbons and moisture in exhaust gases of an internal combustion engine. The adsorbent is contained in an exhaust gas purifying catalyst arranged at an intermediate portion of an exhaust pipe in the internal combustion engine. The catalyst state detector includes a downstream humidity sensor arranged at a location downstream of the adsorbent in the exhaust pipe for detecting a humidity of the exhaust gases, and adsorbent state detecting means for detecting a state of the adsorbent in accordance with a result of a detection made by the downstream humidity sensor.

According to this catalyst state detector for an exhaust gas purifying catalyst, the humidity of exhaust gases downstream of the adsorbent (hereinafter referred to as the "downstream humidity") is detected by the downstream humidity sensor arranged at a location downstream of the adsorbent of the exhaust gas purifying catalyst in the exhaust pipe, and the state of the adsorbent is detected by the adsorbent state detecting means in accordance with the result of the detection. Since the capabilities of the adsorbent for adsorbing hydrocarbons and moisture are in a proportional relationship to each other, the downstream humidity has a high correlation to the amount of hydrocarbons actually adsorbed in the adsorbent. It is therefore possible to accurately detect the state of the adsorbent including adsorption and desorption of hydrocarbons in the adsorbent, deterioration of the adsorbent, and so on by detecting the downstream humidity. Also, since the catalyst state detector employs the humidity sensor cheaper than a hydrocarbon sensor or a temperature sensor, the detector itself can be manufactured at a lower cost.

Preferably, the catalyst state detector further comprises upstream humidity detecting means for detecting a humidity of the exhaust gases at a location upstream of the adsorbent, wherein the adsorbent state detecting means detects the state of the adsorbent in accordance with the upstream humidity detected by the upstream humidity detecting means.

According to this preferred embodiment of the catalyst state detector, by detecting the humidity of the exhaust gases at a location upstream of the adsorbent (upstream humidity) by the upstream humidity detecting means, together with the downstream humidity, i.e., by detecting the humidities at locations upstream and downstream of the adsorbent, the state of the adsorbent can be more correctly detected. The detection of the upstream humidity by the upstream humidity detecting means may include estimation of the upstream humidity in addition to the actual detection thereof.

Preferably, in the catalyst state detector, the upstream humidity detecting means estimates the upstream humidity based on the result of the detection made by the downstream humidity sensor.

According to this preferred embodiment of the catalyst state detector, since the upstream humidity is estimated based on the result of the detection made by the downstream humidity sensor, the state of the adsorbent can be detected using only a single humidity sensor (downstream humidity sensor), so that the detector can be manufactured at a lower cost.

Preferably, in the catalyst state detector, the upstream humidity detecting means is arranged at a location upstream of the adsorbent in the exhaust pipe, and comprises an upstream humidity sensor for detecting the upstream humidity.

According to this preferred embodiment of the catalyst state detector, by detecting the actual upstream humidity by the upstream humidity sensor, the state of the adsorbent can be more accurately detected.

Preferably, the catalyst state detector further includes response delay compensating means for compensating at least one of the downstream humidity sensor and the upstream humidity sensor for a response delay.

According to this preferred embodiment of the catalyst state detector, at least one of the downstream humidity sensor and the upstream humidity sensor is compensated by the response delay compensating means for a response delay, thereby making it possible to correctly detect the state of adsorbent even with a humidity sensor which exhibits a low responsibility, while properly compensating such a humidity sensor for the response delay.

Preferably, in the catalyst state detector, each of the downstream humidity sensor and the upstream humidity sensor includes a sensor element exposed to the exhaust gases for detecting the humidity of the exhaust gases, wherein the detector further includes a heater for heating the sensor element of at least one of the downstream humidity sensor and the upstream humidity sensor, operating state detecting means for detecting an operating state of the internal combustion engine, and heater control means for controlling an operation of the heater in accordance with the operating state detected by the operating state detecting means.

According to this preferred embodiment of the catalyst state detector, the heater control means operates the heater in accordance with the operating state of the internal combustion engine such that the heater heats the sensor element of at least one of the downstream humidity sensor and the upstream humidity sensor, thereby making it possible to bring the heated sensor element into a state suitable for detecting the humidity. For example, since the sensor element is susceptible to the inability of correctly detecting the humidity due to dew condensation or coke deposition, the sensor element may be heated when the internal combustion engine is likely to produce the dew condensation and coke deposition to avoid such inconveniences, thereby making it possible to correctly detect the humidity.

Preferably, in the catalyst state detector, the adsorbent state detecting means includes an adsorbent deterioration detecting means for detecting deterioration of the adsorbent as a state of the adsorbent.

According to this preferred embodiment of the catalyst state detector, the adsorbent deterioration detecting means is used to detect deterioration of the adsorbent in accordance with the result of detection made by the downstream humidity sensor, i.e., the downstream humidity. In other words, by detecting the humidity of exhaust gases after hydrocarbons and moisture therein have been adsorbed by the adsorbent (post-adsorption exhaust gases), it is possible to detect deteriorated capabilities of adsorbing hydrocarbons and moisture in the adsorbent, i.e., the deterioration of the adsorbent. For example, when the adsorbent is not deteriorated, much of moisture in the post-adsorption exhaust gases is adsorbed by the adsorbent, so that the humidity in the post-adsorption exhaust gases is detected to be low. From this result of the detection, it is possible to estimate that the adsorbent is capable of satisfactorily adsorbing hydrocarbons as well as moisture, and therefore determine that the adsorbent is not deteriorated. On the other hand, when the adsorbent is deteriorated, moisture in the post-adsorption exhaust gases is not adsorbed so much, so that the humidity in the post-adsorption exhaust gases is detected to be high. From this result of the detection, it is possible to estimate that the adsorbent is no longer capable of sufficiently adsorbing hydrocarbons as well as moisture, and therefore determine that the adsorbent is deteriorated. In this way, the catalyst state detector according to this preferred embodiment can accurately detect the deterioration of the adsorbent by detecting the downstream humidity which has a high correlation to the deterioration of the adsorbent.

Preferably, in the catalyst state detector, the adsorbent deterioration detecting means detects the deterioration of the adsorbent based on a transition of a result of detection made by the downstream humidity sensor from a start of the internal combustion engine.

According to this preferred embodiment of the catalyst state detector, since the result of the detection by the downstream humidity sensor from the start of the internal combustion engine transitions in accordance with the degree of deterioration of the adsorbent, the deterioration of the adsorbent can be detected reversely based on this transition. As such a transition of the result of the detection made by the downstream humidity sensor, it is possible to use, for example, a time required for the humidity of the post-adsorption exhaust gases to reach a predetermined humidity from the start of the engine, a changing amount of the humidity of the post-adsorbent exhaust gases per unit time, the humidity of the post-adsorption exhaust gases after the lapse of a predetermined time from the start. By comparing these parameters with the counterparts derived by a new adsorbent, which have been previously measured, the deterioration of the adsorbent can be correctly detected based on the magnitude of the difference therebetween.

Preferably, the catalyst state detector further includes atmospheric state detecting means for detecting an atmospheric state, and deterioration detection execution determining means for determining whether or not the adsorbent deterioration detecting means should perform the deterioration detection based on results of detections by the atmospheric state detecting means and the downstream humidity sensor at the start of the internal combustion engine.

According to this preferred embodiment of the catalyst state detector, it is determined by the deterioration detection execution determining means whether or not the deterioration detection should be executed by the adsorbent deterioration detecting means based on the atmospheric state detecting means and the result of detection made by the downstream humidity sensor at the start of the internal combustion engine. In this event, assume, for example, that the saturated absolute humidity in the atmosphere at the start of the engine is detected (calculated) as the atmospheric state, and the adsorbent is determined to be deteriorated when the absolute humidity of the post-adsorption exhaust gases has become larger than the initially detected absolute humidity (initial absolute humidity) by a predetermined amount (the sum of the initial absolute humidity and the predetermined amount) until a predetermined time elapses from the start of the engine. When the humidity in the atmosphere is high on a rainy day or the like, the absolute humidity of the post-adsorption exhaust gases may have reached the saturated absolute humidity before the predetermined time elapses from the start of the engine. In this event, since the downstream humidity sensor indicates the value of the saturated absolute humidity afterwards, an erroneous determination could be made that the adsorbent is not deteriorated even though the adsorbent is actually deteriorated. Therefore, by preventing the execution of the deterioration detection for the adsorbent when the sum of the initial absolute humidity and the predetermined amount is equal to or more than the saturated absolute humidity, it is possible to avoid an erroneous determination as to the deterioration of the adsorbent.

Preferably, in the catalyst state detector, the adsorbent includes zeolite.

According to this preferred embodiment of the catalyst state detector, since the adsorbent includes zeolite, it is possible to provide an adsorbent which is highly heat resistant and also invulnerable to deterioration, as compared with, for example, silica gel, active carbon, or the like used as an adsorbent. In addition, such an adsorbent can properly adsorb hydrocarbons in exhaust gases at low temperatures at the start of the internal combustion engine. Also, the adsorbent comprised of zeolite can desorb hydrocarbons once adsorbed thereby at high temperatures without fail. Further, since zeolite exhibits a significantly high correlation of adsorption characteristics for hydrocarbons and moisture, it is possible to improve the accuracy in the detection of deterioration of the adsorbent by the catalyst state detector for an exhaust gas purifying catalyst which acts as a deterioration detector.

BRIEF DESCRIPTION OF THE DRAWINGS

FIG. 2 is an enlarged cross-sectional view illustrating a hydrocarbon adsorption catalyzer;

FIGS. 14A–14C are graphs for explaining the compensation of a humidity sensor for a response delay, wherein FIG. 14A shows an exemplary transition of an actual humidity (true value); FIG. 14B a value detected by a humidity sensor; and FIG. 14C an upstream humidity after the detected value is compensated for;

FIGS. 19A–19C are graphs showing exemplary transitions of various data from the start of the engine, wherein FIG. 19A shows a cumulative fuel injection time, FIG. 19B a downstream humidity; and FIG. 19C the temperature at a sensor element;

FIG. 21 is a flow chart illustrating steps involved in controlling a switching valve.

DETAILED DESCRIPTION OF THE EMBODIMENTS

Figure 1:
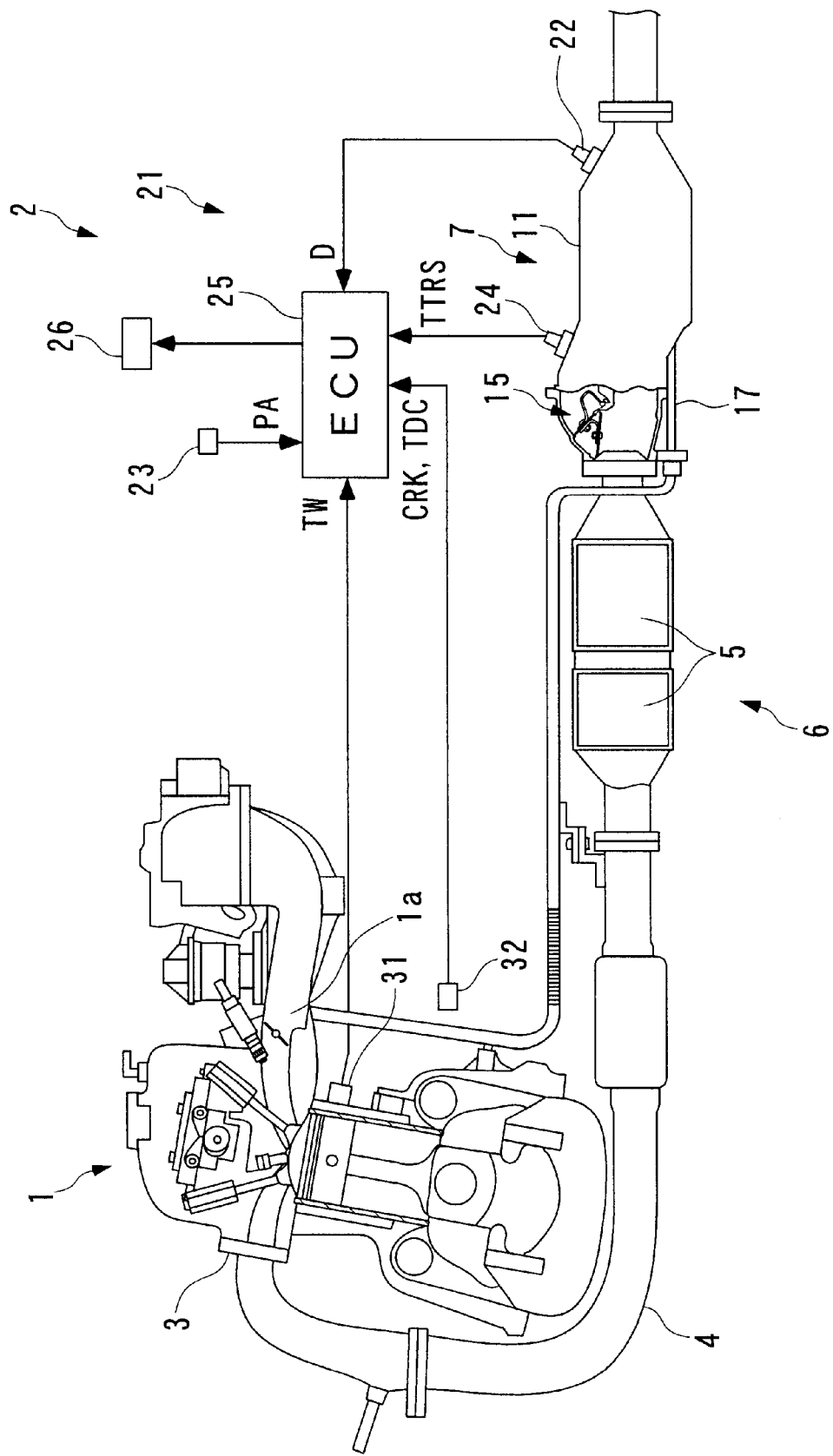
FIG. 1 is a schematic diagram illustrating the configuration of an internal combustion engine in which a catalyst state detector for an exhaust gas purifying catalyst according to a first embodiment of the present invention is applied as a deterioration detector.

In the following, preferred embodiments of the present invention will be described in detail with reference to the accompanying drawings. FIG. 1 illustrates an internal combustion engine in which a catalyst state detector for an exhaust gas purifying catalyst according to a first embodiment of the present invention is applied as an adsorbent deterioration detector. This internal combustion engine 1 (hereinafter simply referred to as the "engine") includes an exhaust system 2 which is configured to emit exhaust gases emitted from the engine 1 to the outside (atmosphere) while purifying the same, and recirculate a portion of the exhaust gases to the engine 1 (EGR). The exhaust system 2 has an exhaust pipe 4 connected to the engine 1 through an exhaust manifold 3.

The exhaust system 2 is also provided, at intermediate locations of the exhaust pipe 4, with an catalyzer 6 having two three-way catalysts 5 as an exhaust gas purifying catalyst for purifying exhaust gases, and a hydrocarbon adsorbent catalyzer 7 for adsorbing hydrocarbons. The two three-way catalysts 5 of the catalyzer 6 are arranged adjacent to each other along the exhaust pipe 4. The three-way catalysts 5 are activated, when they are heated to a predetermined temperature (for example, 300° C.) or higher, to purify harmful substances (hydrocarbons, carbon monoxide and nitrogen compounds) in exhaust gases passing through the catalyst 6 by oxidation-reduction catalyst actions.

The hydrocarbon adsorbent catalyzer 7 is arranged at a location downstream of the catalyzer 6 in the exhaust pipe 4 for adsorbing hydrocarbons in exhaust gases during a starting period of the engine 1 (for example, for approximately 30 to 40 seconds from the start), in which the three-way catalysts 5 are not activated, to largely reduce hydrocarbons in the exhaust gases which would otherwise be emitted to the outside. As illustrated in FIG. 2, the hydrocarbon adsorbent catalyzer 7 comprises a case 11 defining a substantially cylindrical shell; a main cylindrical exhaust pipe 12 arranged in the case 11; a switching valve 15 arranged near an upstream end of the main exhaust pipe 12 (at a left end region in FIG. 2) for communicating an exhaust gas inlet port 11a of the case 11 to either the inside (main exhaust passage 13) or the outside (bypass exhaust passage 14) of the main exhaust pipe 12; and a thick cylindrical HC adsorbent 16 arranged between the outer peripheral surface of the main exhaust pipe 12 and the inner peripheral surface of the case 11 for adsorbing hydrocarbons in exhaust gases which flow into the bypass exhaust passage 14.

The main exhaust pipe 12 has an upstream end, except for its upper portion, and the overall periphery of a downstream end air-tight connected to the inner face of the case 11. The main exhaust pipe 12 is formed, at a location near the downstream end, with four throughholes 12a at equal intervals in the circumferential direction, such that downstream portions of the main exhaust passage 13 and the bypass exhaust passage 14 communicate with each other through the throughholes 12a. The switching valve 15 has a main open/close plate 15a for opening/closing an opening of the main exhaust passage 13 on the upstream side; and a bypass open/close plate 15b for opening/closing an opening of the bypass exhaust passage 14 on the upstream side. The open/close plates 15a, 15b are connected to each other in a V-shape. The open/close plates 15a, 15b are also connected to a pivot shaft 15d through a supporting member 15c, such that the pivot shaft 15d is pivotally driven by a valve driving mechanism, not shown, to cause the main open/close plate 15a to open the main exhaust passage 13 and the bypass open/close plate 15b to close the bypass exhaust passage 14 (see FIG. 2), or to cause the main open/close plate 15a to close the main exhaust passage 13 and the bypass open/close plate 15b to open the bypass exhaust passage 14.

The HC adsorbent 16 comprises a cylindrical case 16a having a diameter smaller than that of the case 11; and a thick cylindrical adsorbent body 16b arranged in the cylindrical case 16a to have its inner face arranged in contact with the outer peripheral surface of the main exhaust pipe 12. The adsorbent body 16b is comprised of a metal honeycomb core (not shown) which carries zeolite on its surface, so that when exhaust gases introduced into the bypass exhaust passage 14 pass through the interior of the HC adsorbent 16, i.e., the adsorbent body 16b, hydrocarbons and moisture in the exhaust gases are adsorbed by the zeolite.

Zeolite, which has high heat resistant properties, adsorbs hydrocarbons in a low temperature range (for example, below 100° C.), and desorbs hydrocarbons once adsorbed thereby at a predetermined temperature or more (for example, 100 to 250° C.). Then, the desorbed hydrocarbons are recirculated to the engine 1 through an EGR pipe 17 which has the two ends connected to the case 11 and an intake pipe 1a of the engine 1, respectively. The recirculated hydrocarbons are burnt by the engine 1. It should be noted that the zeolite is only required to have the ability of adsorbing hydrocarbons and moisture and is not particularly limited in type. This embodiment employs a mixture of Y-type, Ga-MFI and ferrierite 100.

In a gap between the outer peripheral surface of the HC adsorbent 16 constructed as described above and the inner peripheral surface of the case 11, an annular sealing material 18 is arranged on the upstream side such that all exhaust gases introduced into the bypass exhaust passage 14 flow into the HC adsorbent 16.

Next, description will be made on the deterioration detector 21 for detecting deterioration of the hydrocarbon adsorbent catalyzer 7, more specifically, deterioration of the HC adsorbent 16 arranged therein. The deterioration detector 21, which is attached to the case 11 of the hydrocarbon adsorbent catalyzer 7, comprises a humidity sensor 22 (downstream humidity sensor) for detecting a humidity of post-adsorption exhaust gases, which are exhaust gases having passed through the HC adsorbent 16; an atmospheric pressure sensor 23 for detecting an atmospheric pressure; a temperature sensor 24 attached to the case 11 for detecting the temperature of the HC adsorbent 16; an ECU 25 (adsorbent deterioration detecting means, atmospheric state detecting means, deterioration detection execution determining means) for detecting deterioration of the HC adsorbent 16 based on the results of detections by the sensors 22, 23, 24; an alarm lamp 26 responsive to a determination of the ECU 25 that the HC adsorbent 16 is deteriorated for notifying the driver to that effect; and so on.

The humidity sensor 22 is configured to detect an absolute humidity D of the post-adsorption exhaust gases, and sends a detection signal indicative of the absolute humidity D to the ECU 25. The atmospheric pressure sensor 23 in turn detects an atmospheric pressure PA and sends a detection signal indicative of the atmospheric pressure PA to the ECU 25. Also, the temperature sensor 24 detects the temperature of exhaust gases to detect the temperature TTRS of the HC adsorbent 16 (HC adsorbent temperature), and sends a detection signal indicative of the temperature TTRS to the ECU 25. Since details on the humidity sensor 22 are described in Japanese Patent Application No. 2000-23085 previously proposed by the present applicant, description thereon is herein omitted.

A water temperature sensor 31 comprised of a thermistor or the like is also attached to the body of the engine 1. The water temperature sensor 31 detects an engine water temperature TW, which is the temperature of cooling water that circulates in a cylinder block of the engine 1, and sends a detection signal indicative of the engine water temperature TW to the ECU 25. The engine 1 is also provided with a crank angle sensor 23 which supplies the ECU 25 with a CRK signal and a TDC signal, which are pulse signals, at every predetermined crank angle as a crank shaft, not shown, of the engine 1 is rotated. The TDC signal is such that one pulse is supplied to the ECU 25, for example, each time the crank shaft is rotated over 180 degrees.

The ECU 25 is based on a microcomputer which comprises an I/O interface, a CPU, a RAM, a ROM and so on. The detection signals from the variety of sensors such as the foregoing humidity sensor 22, atmospheric sensor 23 and so on undergo A/D conversion and waveform shaping in the I/O interface, respectively, and thereafter inputted to the CPU. The CPU determines a operating state of the engine 1 in response to the detection signals from the variety of sensors in accordance with a control program and so on stored in the ROM, and also detects whether the HC adsorbent 16 is deteriorated based on the determined operating state. Then, the ECU 25 outputs a control signal to the alarm lamp 26, when it determines that the HC adsorbent 16 is deteriorated, to turn on the alarm lamp 26, thereby notifying the driver of the deterioration of the HC adsorbent 16.

Figure 3:
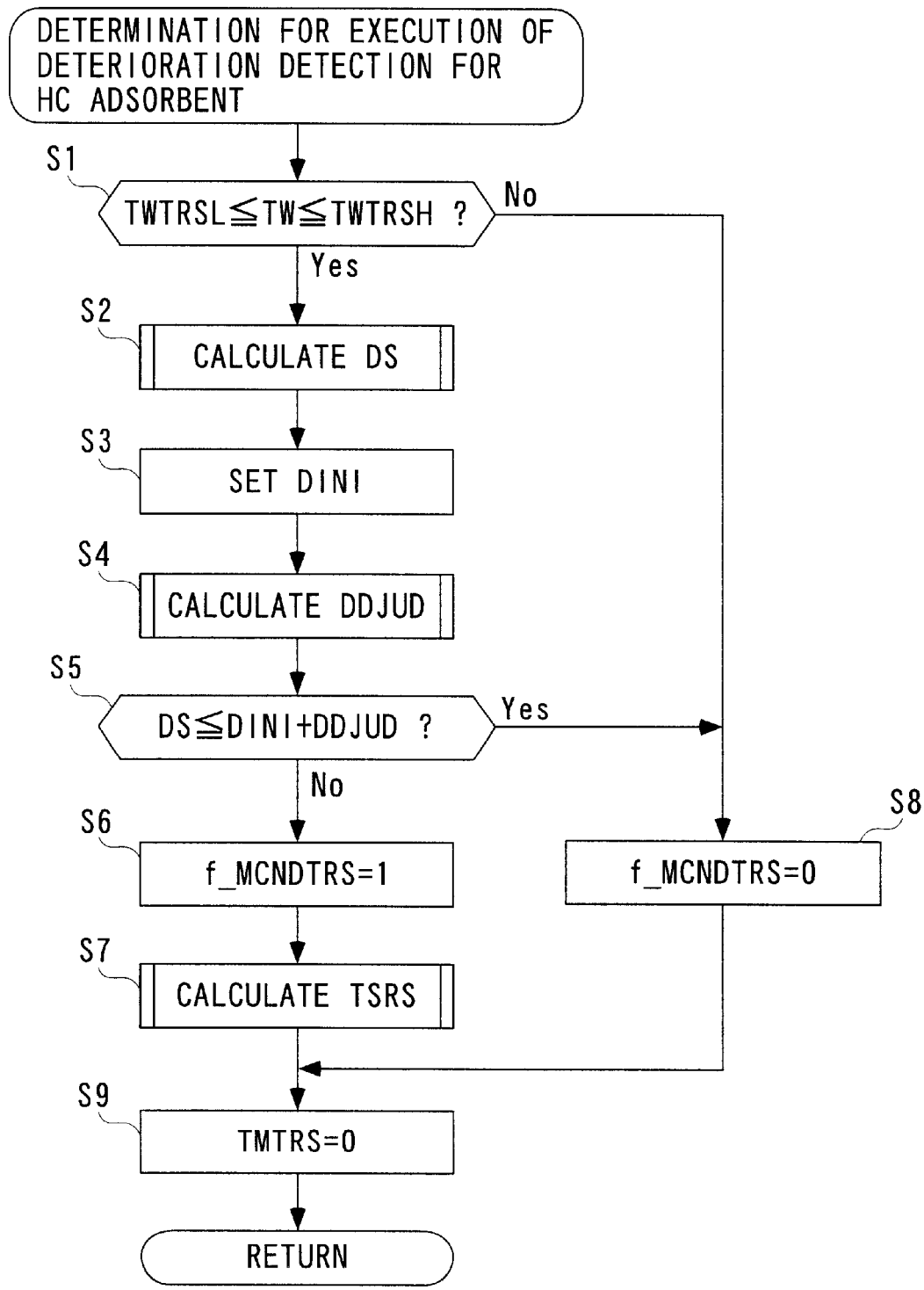
FIG. 3 is a flow chart illustrating steps involved in determining whether or not a deterioration detector should detect deterioration of an HC adsorbent.
Figure 4:
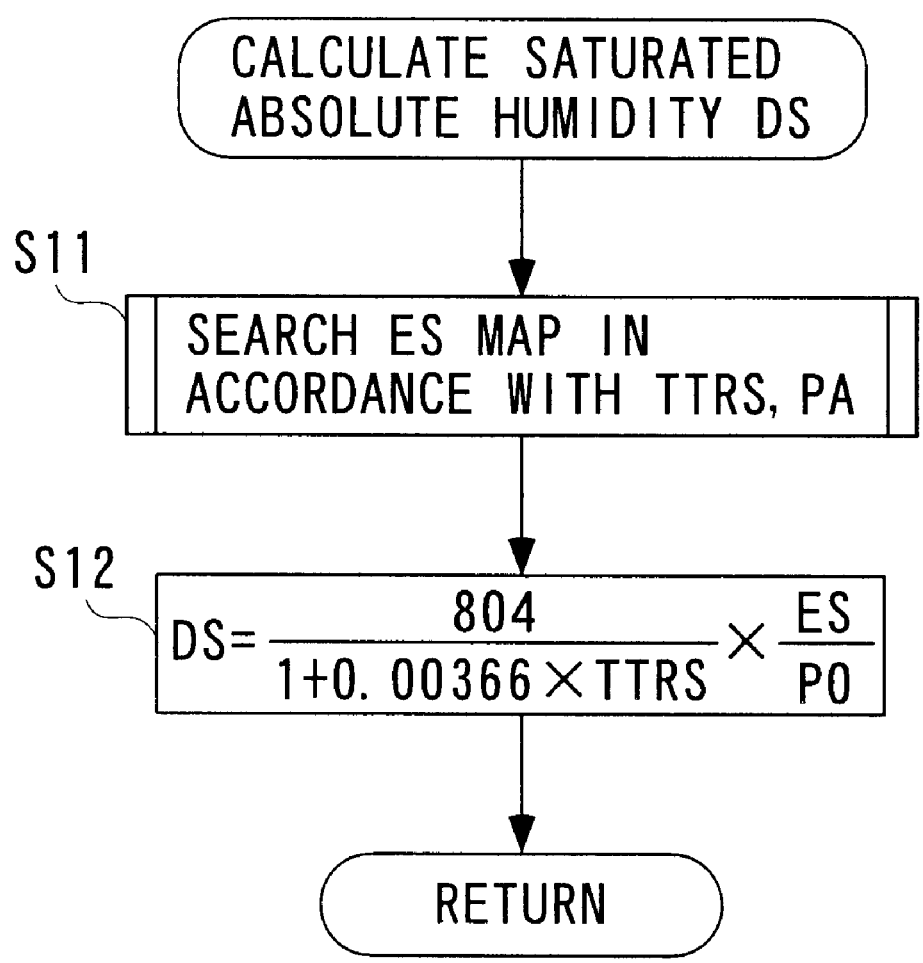
FIG. 4 is a flow chart illustrating steps involved in calculating a saturated absolute humidity DS.
Figure 5:
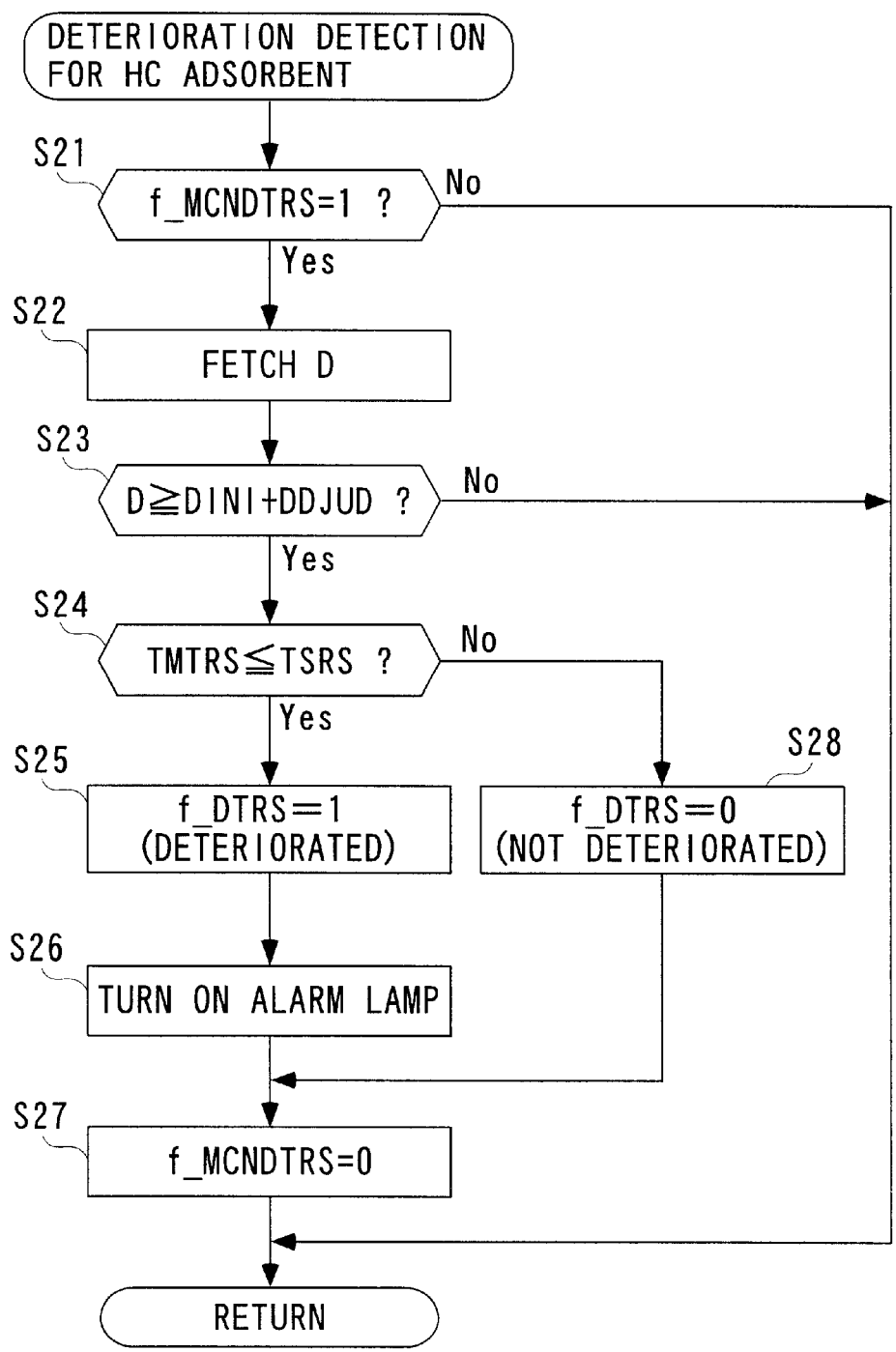
FIG. 5 is a flow chart illustrating steps executed by the deterioration detector for detecting deterioration of the HC adsorbent.

Next, a detection of deterioration of the HC adsorbent 16, performed by the deterioration detector 21, will be described specifically with reference to flow charts of FIGS. 3 to 5. FIG. 3 is a flow chart illustrating steps involved in determining whether or not deterioration detection should be performed. This execution determination is performed only once upon starting the engine 1. First, at step 1 (indicated by "S1" in FIG. 3 and the subsequent drawings as well), it is determined whether or not the engine water temperature TW of the engine 1 is within a predetermined temperature range, i.e., equal to or higher than a lower limit temperature TWTRSL (for example, 0° C.) and equal to or lower than an upper limit temperature TWTRSH (for example, 35° C.). This step 1 is provided for determining whether or not the engine 1 is normally started. More specifically, when the engine water temperature TM is lower than the lower limit temperature TWTRSL, some humidity sensor 22 cannot correctly detect the humidity of the post-adsorption exhaust gases due its lower sensibility, so that this situation must be eliminated. On the contrary, when the engine water temperature TW is higher than the upper limit temperature TWTRSH, this situation must be eliminated as well because the engine 1 could have been hot restarted.

Therefore, if the result of the determination at step 1 is No, i.e., if the engine water temperature TW is lower than the lower limit temperature TWTRSL or higher than the upper limit temperature TWTRSH, a deterioration detection execution flag f_MCNDTRS is set to "0" indicating that the deterioration detection for the HC adsorbent 16 should not be performed (step 8), and a timer value TMTRS of an up-count timer is reset (step 9), followed by the termination of the program.

On the other hand, if the result of the determination at step 1 is Yes, i.e., if the engine water temperature TW is equal to or higher than the lower limit temperature TWTRSL and equal to or lower than the upper limit temperature TWTRSH, a saturated absolute humidity DS is calculated (step 2). This calculation first involves finding a saturated vapor pressure ES (step 11) by searching a predetermined saturated vapor pressure ES map (not shown) in accordance with the HC adsorbent temperature TTRS and the atmospheric pressure PA at the start of the engine 1, as illustrated in FIG. 4.

In this embodiment, the HC adsorbent temperature TTRS is detected by the temperature sensor 24 attached to the case 11 of the hydrocarbon adsorbent catalyzer 7. Alternatively, the HC adsorbent temperature TTRS may be replaced with an exhaust gas temperature detected by a temperature sensor attached to the exhaust pipe 4, or an intake air temperature detected by an existing intake air temperature sensor generally arranged in the engine 1. Also, the atmospheric pressure PA may be replaced by an intake pipe absolute pressure before starting the engine, detected by an existing intake air pressure sensor generally arranged in the engine 1.

Next, the saturated absolute humidity DS is calculated by the following equation using the saturated vapor pressure ES calculated at step 11, and the HC adsorbent temperature TTRS (step 12):

$$DS = \frac{804}{1 + 0.00366 \times TTRS} \times \frac{ES}{PO}$$

where PO is a predetermined standard air pressure (for example, 760 mmHg).

Figure 6A:
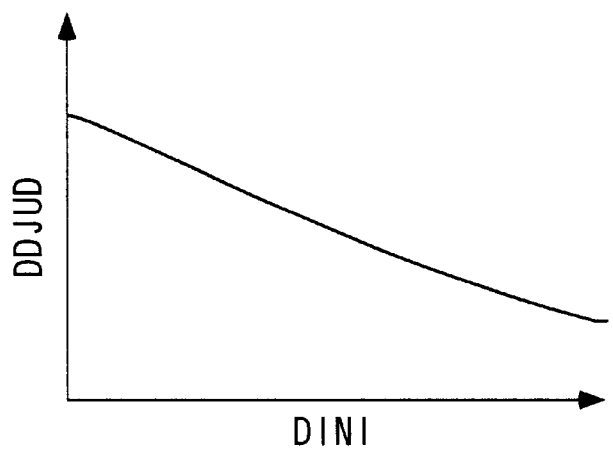
FIG. 6A is a table showing a relationship between an absolute humidity initial value DINI and an additional humidity value DDJUD.

After calculating the saturated absolute humidity DS by the equation, the absolute humidity D of the post-adsorption exhaust gases detected by the humidity sensor 22 at the start of the engine 1 is set as an absolute humidity initial value DINI at step 3 in FIG. 3. Then, an additional humidity value DDJUD for determining deterioration is calculated in accordance with the absolute humidity initial value DINI (step 4). This calculation is made by searching a table (additional humidity value table), as shown in FIG. 6A, which is stored in the ROM. In the additional humidity value table, additional humidity value DDJUD for the deterioration determination is set substantially in a linear fashion such that it presents a smaller value as the absolute humidity initial value DINI is larger.

Figure 7:
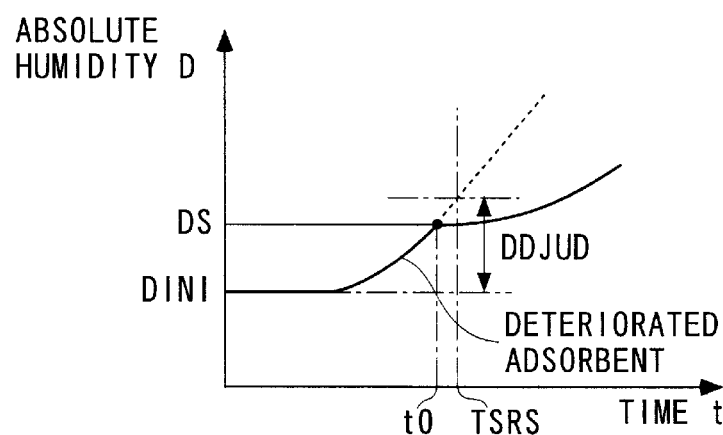
FIG. 7 is a time chart showing an exemplary transition which is encountered when an absolute humidity D of post-adsorption exhaust gases reaches the saturated absolute humidity DS before the deterioration determining time TSRS elapses.

Next, it is determined whether or not the saturated absolute humidity DS calculated at step 2 is equal to or less than the sum of the absolute humidity initial value DINI and the additional humidity value DDJUD for determining deterioration (step 5). The determination at the step 5 is made for the reason set forth below. As described later, for detecting deterioration of the HC adsorbent 16, it is determined that the HC adsorbent 16 is deteriorated when the absolute humidity D of the post-adsorption exhaust gases is equal to or higher than a threshold value represented by the sum of the absolute humidity initial value DINI and the additional humidity value DDJUD, and when this fact is detected before a deterioration determining time TSRS, later described, elapses after the start of the engine 1. Therefore, if the threshold value is equal to or higher than the saturated absolute humidity DS (Yes at step 5), the absolute humidity D of the post-adsorption exhaust gases may have reached the saturated absolute humidity DS before the deterioration determining time TSRS elapses, as can be seen in FIG. 7 (at time t0 in FIG. 7). In this event, the absolute humidity D of the post-adsorption exhaust gases after the time t0 deviates from an essential transition indicated by a broken line in FIG. 7 but changes along a transition of the saturated absolute humidity DS. In this event, since the humidity sensor 22 indicates the saturated absolute humidity DS, an erroneous determination may be made that the HC adsorbent 16 is not deteriorated in spite of the fact that the HC adsorbent 16 has been deteriorated. Therefore, the determination at step 5 avoids such an erroneous determination as to the deterioration of the HC adsorbent 16 in the case as mentioned above, thereby making it possible to improve the determination accuracy.

Also, in the additional humidity value table in FIG. 6A, the absolute humidity D of the post-adsorption exhaust gases exhibits a lower rising rate as the absolute humidity initial value DINI is larger (see FIG. 8), so that the additional humidity value DDJUD is set to a smaller value as the absolute humidity initial value DINI is larger, as described above, for correctly detecting deterioration of the HC adsorbent 16 by properly setting the additional humidity value DDJUD.

Thus, if the result of the determination at step 5 is Yes, i.e., if the saturated absolute humidity DS is equal to or lower than the threshold value (the sum of the absolute humidity initial value DINI and the additional humidity value DDJUD), the deterioration detection execution flag f_MCNDTRS is set to "0" (step 8), indicating that the deterioration detection should not be performed, in order to avoid an erroneous determination on the deterioration of the HC adsorbent 16, as described above, and the timer value TMTRS of the up-count timer is reset (step 9), followed by the termination of the program. On the other hand, if the result of the determination at step 5 is No, i.e., if the saturated absolute humidity DS is larger than the threshold value, the deterioration detection execution flag f_MCNDTRS is set to "1" (step 6), indicating that the deterioration detection should be performed for the HC adsorbent 16. Subsequently, the deterioration determining time TSRS is calculated (step 7), the timer value TMTRS of the up-counter timer is once reset, and the up-count timer is again started (step 9), followed by the termination of the program.

Figure 6B:
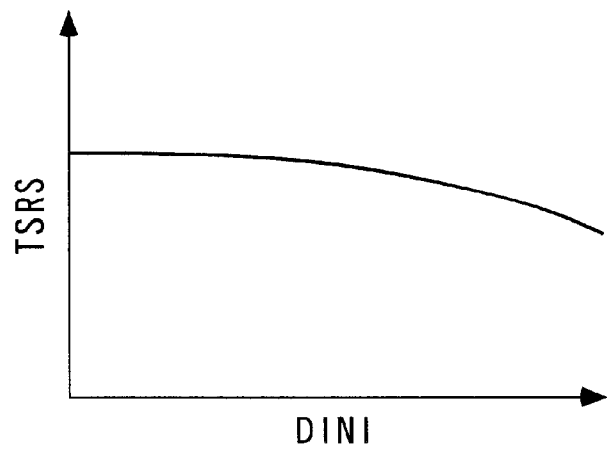
FIG. 6B is a table showing a relationship between the absolute humidity initial value DINI and a deterioration determining time TSRS.

The calculation of the deterioration determining time TSRS at step 7 is made by searching a table (deterioration determining time table) as shown in FIG. 6B in accordance with the absolute humidity initial value DINI. Since moisture (steam) in the post-adsorbent exhaust gases reaches a saturated state earlier as the absolute humidity initial value DINI is larger, an erroneous determination on the deterioration of the HC adsorbent 16 may occur as described above. To avoid the erroneous determination, the deterioration determining time table is set such that the deterioration determining time TSRS gradually becomes smaller value, drawing a gentle trajectory, as the absolute humidity initial value DINI is larger.

Next, steps involved in the detection of deterioration of the HC adsorbent 16 will be described with reference to the flow chart of FIG. 5. The illustrated program is executed in synchronism with the TDC signal inputted to the ECU 25 from the crank angle sensor, or at every predetermined time (for example, 50 msec). In this program, it is first determined at step 21 whether or not the deterioration detection execution flag f_MCNDTRS set in the execution determination in FIG. 3 is "1." If the result of the determination at this step 21 is No, i.e., if the deterioration detection execution flag f_MCNDTRS is "0," the program is terminated at this time, assuming that the deterioration detection for the HC adsorbent 16 has been made or the deterioration detection for the HC adsorbent 16 should not be performed at present. On the other hand, if the result of the determination at step 21 is Yes, i.e., the deterioration detection execution flag f_MCNDTRS is "1," the absolute humidity D of the post-adsorption exhaust gases, detected by the humidity sensor 22, is fetched (step 22).

It is next determined whether or not the absolute humidity D is equal to or higher than the sum of the absolute humidity initial value DINI and the additional humidity value DDJUD (threshold value) (step 23). If the result of the determination at this step is No, i.e., if the absolute humidity D is lower than the threshold value, the program is terminated at this time. On the other hand, if the result of the determination at step 23 is Yes, i.e., if the absolute humidity D is equal to or higher than the threshold value, it is determined at subsequent step 24 whether or not the timer value TMTRS of the up-count timer, started at step 9 in the execution determination, is equal to or less than the deterioration determining time TSRS calculated at step 7 in the execution determination. If the result of the determination at this step is Yes, i.e., if the deterioration determining time TSRS has not elapsed after the start of the engine 1, a deterioration flag f_DTRS is set to "1," assuming that the absolute humidity D rises at a high rate, indicating that the HC adsorbent 16 is deteriorated, and the alarm lamp 26 is turned on (step 26) for notifying the driver of the deteriorated HC adsorbent 16. Then, the deterioration detection execution flag f_MCNDTRS is set to "0" (step 27), assuming that the deterioration detection for the HC adsorbent 16 is completed, followed by the termination of the program.

On the other hand, if the result of the determination at step 24 is No, i.e., if the deterioration determining time TSRS has elapsed after the start of the engine 1, the deterioration flag f_DTRS is set to "0" (step 28), assuming that the absolute humidity D rises at a low rate, indicating that the HC adsorbent 16 is not deteriorated, and the deterioration detection execution flag f_MCNDTRS is set to "0" (step 27), followed by the termination of the program. The deterioration flag f_DTRS is utilized for a fail-safe operation or the like of the engine 1 by the ECU 25.

Figure 8:
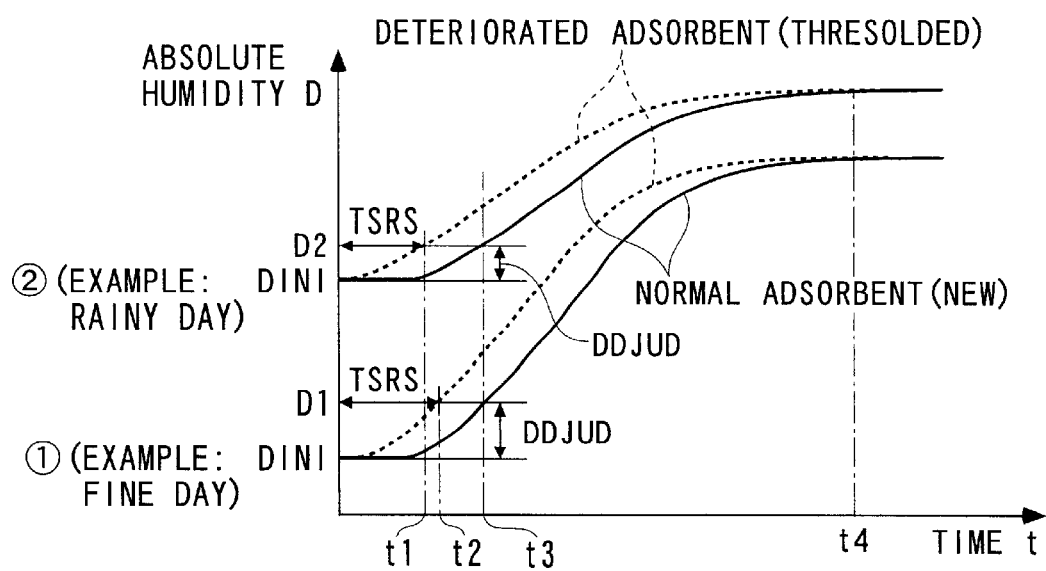
FIG. 8 is a time chart showing, in comparison, exemplary transitions of the absolute humidity D of post-adsorption exhaust gases with a normal HC adsorbent (new one) and a deteriorated HC adsorbent (thresholded one) when the absolute humidity initial value DINI is low and high, respectively.

FIG. 8 shows, in comparison, transitions of the results of the detection by the humidity sensor 22 from the start of the engine 1 when the absolute humidity initial value DINI is low (for example, (1) on a fine day) and when the absolute humidity initial value DINI is high (for example, (2) on a rainy day), more specifically, exemplary transitions of the absolute humidity D of the post-adsorption exhaust gases when a new HC adsorbent 16 (normal one) free of deterioration is used and when an HC adsorbent 16 (deteriorated one) is used as a thresholded adsorbent which is determined to be deteriorated. As shown in FIG. 8, either (1) on a fine day or (2) on a rainy day, the absolute humidity D transitions in the following manner. The absolute humidity D starts gradually increasing, after a certain time has elapsed from the start of the engine 1, increases at a higher rising rate, and subsequently (after passing a time t4), converges to a constant value (saturated absolute humidity).

First, (1) a transition of the absolute humidity D of the post-adsorption exhaust gases on a fine day will be described with reference to FIG. 8. As shown in FIG. 8, when the HC adsorbent 16 is deteriorated, the absolute humidity D exceeds a threshold value D1 (the detected absolute humidity D transitions on the left side of a broken line of (1)) before time t2, i.e., before the deterioration determining time TSRS elapses from the start of the engine 1, so that it can be determined from the absolute humidity D exceeding the threshold value D1 that the HC adsorbent 16 is deteriorated. On the other hand, when the HC adsorbent 16 is not deteriorated, the detected absolute humidity D transitions between a solid line and the broken line of (1). Since the absolute humidity D will not exceed the threshold value D1 until the deterioration determining time TSRS elapses after the start of the engine 1 (till time t2), it can be determined that the HC adsorbent 16 is not deteriorated. Similarly, (2) on a rainy day, as shown in FIG. 8, when the HC adsorbent 16 is deteriorated, the absolute humidity D exceeds a threshold value D2 (the detected absolute humidity D transitions on the left side of a broken line of (2)) before the deterioration determining time TSRS elapses (at time t1), so that it can be determined that the HC adsorbent 16 is deteriorated. On the other hand, when the HC adsorbent 16 is not deteriorated, when the HC adsorbent 16 is not deteriorated, the detected absolute humidity D transitions between a solid line and the broken line of (2). Since the absolute humidity D will not exceed the threshold value D2 until the deterioration determining time TSRS elapses after the start of the engine 1 (till time t1), it can be determined that the HC adsorbent 16 is not deteriorated.

Also, in these cases, since the additional humidity value DDJUD is set smaller as the absolute humidity initial value DINI of the post-adsorption exhaust gases is larger (see FIG. 6A), the deterioration of the HC adsorbent 16 can be correctly detected even on a rainy day in addition to a fine day.

As described above in detail, according to the deterioration detector 21 of this embodiment, since deterioration of the HC adsorbent 16 is detected by detecting the humidity of the post-adsorption exhaust gases in accordance with the amount of moisture adsorption which has a high correlation to the amount of adsorbed hydrocarbons in the HC adsorbent 16, the deterioration can be accurately detected. In addition, unlike the prior art utilizing a hydrocarbon sensor and a temperature sensor, the inexpensive humidity sensor 22 may be utilized, so that the deterioration detector 21 itself can be manufactured at a low cost.

Also, in this embodiment, deterioration of the HC adsorbent 16 is detected by comparing a time required for the absolute humidity D of the post-adsorption exhaust gases to reach a predetermined threshold value (the sum of the absolute humidity initial value DINI and the additional humidity value DDJUD) with that time measured when a normal HC adsorbent 16 is used. The present invention, however, is not limited to this manner of detecting the deterioration. Alternatively, deterioration of the HC adsorbent 16 may be detected based on another transition of a result detected by the humidity sensor 22. Specifically, deterioration of the HC adsorbent 16 can be correctly detected by comparing the amount of a change in humidity of post-adsorption exhaust gases per unit time, the humidity of the post-adsorption exhaust gases after the lapse of a predetermined time from the start of the engine 1, and so on with those associated with a normal HC adsorbent, which have been previously measured.

Next, a second embodiment of the present invention will be described with reference to FIGS. 9 to 21. It should be noted that components having the same functions as those in the first embodiment are designated the same reference numerals, and description thereon is omitted or simplified.

Figure 9:
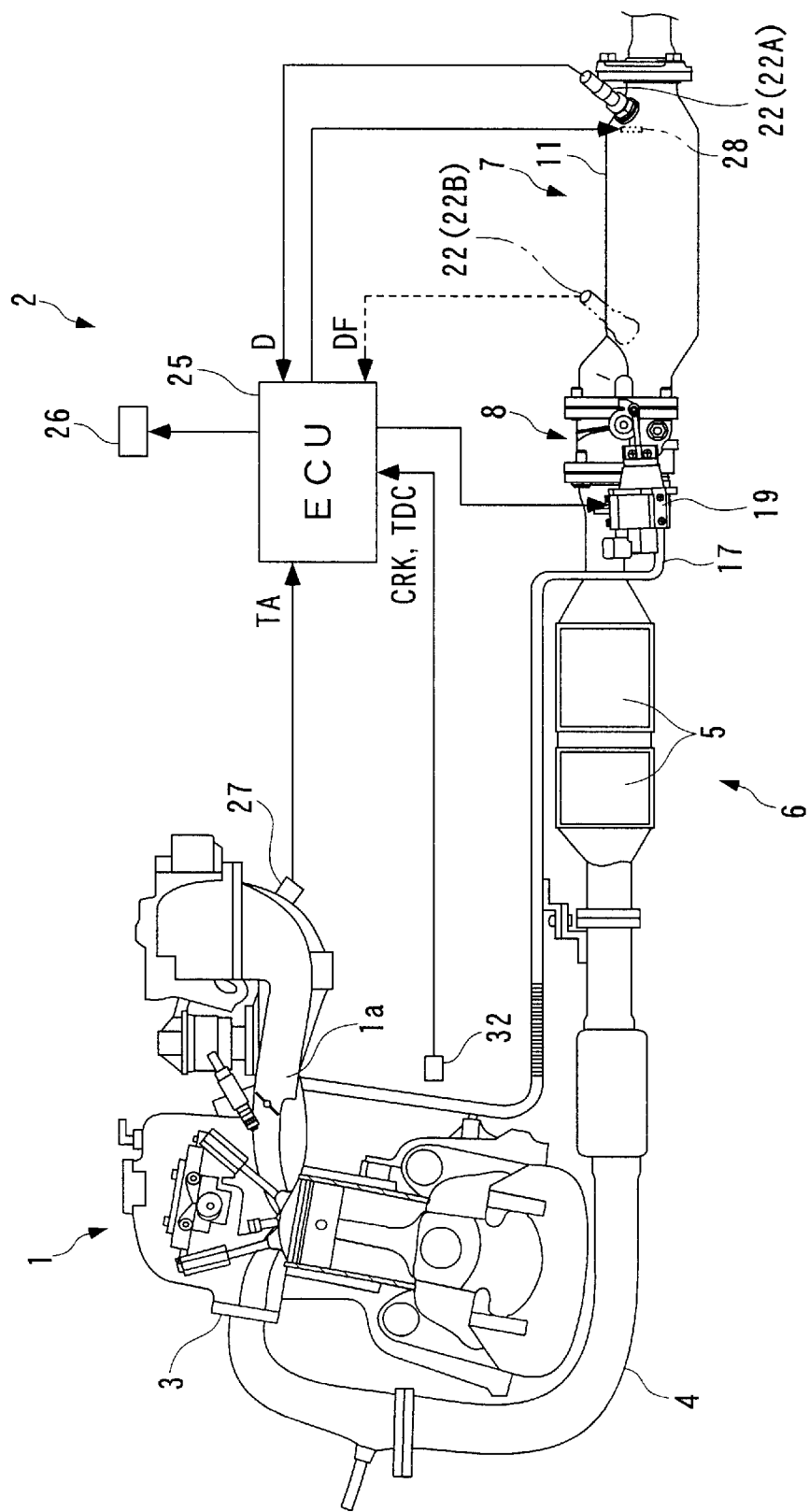
FIG. 9 is a schematic diagram illustrating the configuration of an internal combustion engine to which a second embodiment of the present invention is applied.
Figure 10:
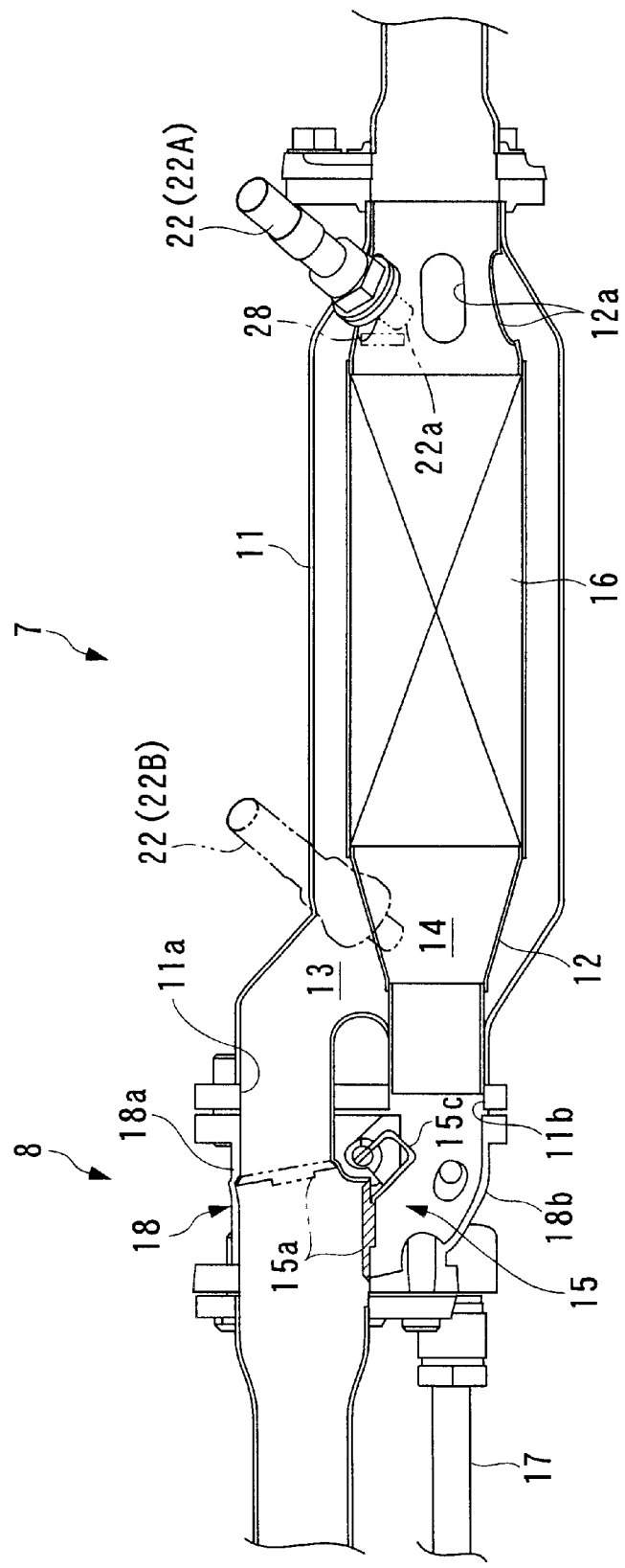
FIG. 10 is an enlarged cross-sectional view illustrating a hydrocarbon adsorbent catalyst in FIG. 9.

As illustrated in FIGS. 9 and 10, an exhaust system 2 of an engine 1 in the second embodiment has a catalyzer 6 and a hydrocarbon adsorbent catalyzer 7 at intermediate locations of an exhaust pipe 3, as is the case in the aforementioned first embodiment. The hydrocarbon adsorbent catalyzer 7 is connected to a downstream end of the catalyzer 6 through an exhaust passage switch 8. The hydrocarbon adsorbent catalyst 7 comprises a case 11 comprising a substantially cylindrical shell; a bypass exhaust pipe 12 arranged in the case 11; and a cylindrical HC adsorbent 16 filled in an intermediate portion of the bypass exhaust pipe 12 for adsorbing hydrocarbons in exhaust gases which flow into the bypass exhaust pipe 12.

As illustrated in FIG. 10, the case 11 has it upstream end branched into two. An upper opening 11a communicates with an exhaust passage of the exhaust pipe 4, and also communicates with a space having an annular cross section (main exhaust passage 13) outside the bypass exhaust pipe 12 in the case 11. A lower opening 11b communicates with a space (bypass exhaust passage 14) in the bypass exhaust pipe 12.

The bypass exhaust pipe 12 has its upstream end connected to the inner face of the lower opening 11b of the case 11 and its downstream end connected to the inner face of the downstream end of the case 11, both in an air-tight structure. The bypass exhaust pipe 12 is formed, at a location near the downstream end thereof, with a plurality (for example, five) of elongated throughholes 12a at equal intervals in the circumferential direction, such that downstream ends of the main exhaust passage 13 and the bypass exhaust passage 14 in the case 11 communicate with each other through the throughholes 12a.

The HC adsorbent 16 is comprised of a metal honeycomb core which carries zeolite on its surface, so that when exhaust gases introduced into the bypass exhaust passage 14 pass through the interior of the HC adsorbent 16, hydrocarbons and moisture in the exhaust gases are adsorbed by the zeolite.

The exhaust passage switch 8 connects the hydrocarbon adsorbent catalyzer 7 constructed as described above to the catalyzer 6, and selectively switches an exhaust passage of exhaust gases passing through the catalyzer 6 to the main exhaust passage 13 or to the bypass exhaust passage 14 in accordance with an activated state of a three-way catalyst 5. The exhaust passage switch 8 comprises a substantially cylindrical coupling pipe 18, and a switching valve 15 arranged in the coupling pipe 18 for switching the exhaust passage. The coupling pipe 18 is comprised of a main pipe portion 18a for air-tight communicating the lower end of the catalyzer 6 with the main exhaust passage 13 of the hydrocarbon adsorbent catalyzer 7; and a branch pipe portion 18b branched off an upstream portion of the main pipe portion 18a for air-tight communicating the lower end of the catalyzer 6 with the bypass exhaust passage 14 of the hydrocarbon adsorbent catalyst 7.

The switching valve 15 in turn comprises a discoidal valve body 15a, and an arm 15c in a predetermined shape for supporting the valve body 15a at one end thereof. As the arm 15c is pivotally driven about the other end thereof over a predetermined angular distance by a switching valve driver 19 (see FIG. 9) controlled by an ECU 25, the valve body 15a is also pivoted to open one of the main pipe portion 18a and the branch pipe portion 18b and to close the other. Thus, when the valve body 15a opens the main pipe portion 18a and closes the branch pipe portion 18b as illustrated in FIG. 10, exhaust gases through the catalyzer 6 passes the main pipe portion 18a, and flow into the main exhaust passage 13 in the case 11. Conversely, when the valve body 15a closes the main pipe portion 18a and opens the branch pipe portion 18b (see two-dot chain lines in FIG. 10), exhaust gases through the catalyzer 6 passes the branch pipe portion 18b and flows into the bypass exhaust passage 14. The arm 15c is provided at the other end with a helical torsion coil spring, not shown, which causes the valve body 15a to normally open the main pipe portion 18a and close the branch pipe portion 18b, as illustrated in FIG. 10.

In the exhaust passage switch 8 constructed as described above, immediately after the engine 1 is started, the valve 15a normally closing the branch pipe portion 18b is pivotally driven to open the branch pipe portion 18b and close the main pipe portion 18a. This causes exhaust gases passing through the catalyzer 6 to flow through the branch pipe portion 18b and along the bypass exhaust passage 14, whereby hydrocarbons and moisture are adsorbed by the HC adsorbent 16, and the exhaust gases passing through the HC adsorbent 16 flows further toward the downstream, and is eventually emitted to the outside. Then, as described later, when it is determined that the adsorption of hydrocarbons in the HC adsorbent 16 is completed, the valve body 15a which has been closed the main pipe portion 18a is again pivotally driven to open the main pipe portion 18a and close the branch pipe portion 18b. This causes the exhaust gases passing through the catalyzer 6 to flow through the main pipe portion 18a and along the main exhaust passage 13 in the case 11. Then, the exhaust gases flow into the bypass exhaust pipe 12 through the communication holes 12a in the downstream end portion of the bypass exhaust pipe 12, flow further toward the downstream, and is eventually emitted to the outside.

The hydrocarbon adsorbent catalyzer 7 is provided with a downstream humidity sensor 22A attached to the case 11 for detecting a humidity D on the downstream side of the HC adsorbent 16 (downstream humidity) in the bypass exhaust passage 14. The downstream humidity sensor 22A outputs a detection signal indicative of the humidity D to the ECU 25. An intake air temperature sensor 27 for detecting an intake air temperature TA is also connected to the ECU 25. The ECU 25 (adsorbent state detecting means, upstream humidity detecting means, response delay compensating means, driving state detecting means, heater control means) performs a variety of controls for the engine 1 and the exhaust system 2, including the switching valve 15, based on the results of detection by the sensors 22A, 27, and so on.

The downstream humidity sensor 22A is attached to a downstream end portion of the case 11 such that a sensor element 22a at a leading end thereof faces the bypass exhaust passage 14 through one of the communication holes 12a of the bypass exhaust pipe 12. As described above, the downstream humidity sensor 22A detects a downstream humidity D and sends a detection signal indicative of the downstream humidity D to the ECU 25. This detection signal is treated as a detection signal indicative of a relative humidity in the ECU 25 when a condition suitable for the HC adsorbent 16 to adsorb hydrocarbons (hereinafter referred to as the "hydrocarbon adsorption condition), later described, is established, and treated as a detection signal indicative of an absolute humidity when the hydrocarbon adsorption condition is not established. The downstream humidity sensor 22A is also provided with a heater 28 for heating the sensor element 22a. The heater 28, which is controlled by the ECU 25, operates for a predetermined time to heat the sensor element 22a of the downstream humidity sensor 22A when a predetermined condition, later described, is established.

In addition to the downstream humidity sensor 22A, an upstream humidity sensor 22B, which is the same as the downstream humidity sensor 22A, may be provided at a location upstream of the HC adsorbent 16, as indicated by two-dot chain lines in FIGS. 9 and 10. The upstream humidity sensor 22B detects a humidity DF at the location upstream of the HC adsorbent 16 in the bypass exhaust passage 14 (hereinafter simply referred to as the "upstream humidity"). It should be noted that in the following description, when the downstream humidity sensor 22A and the upstream humidity sensor 22B are not particularly distinguished, these sensors are collectively referred to simply as the "humidity sensor 22."

Figure 11:
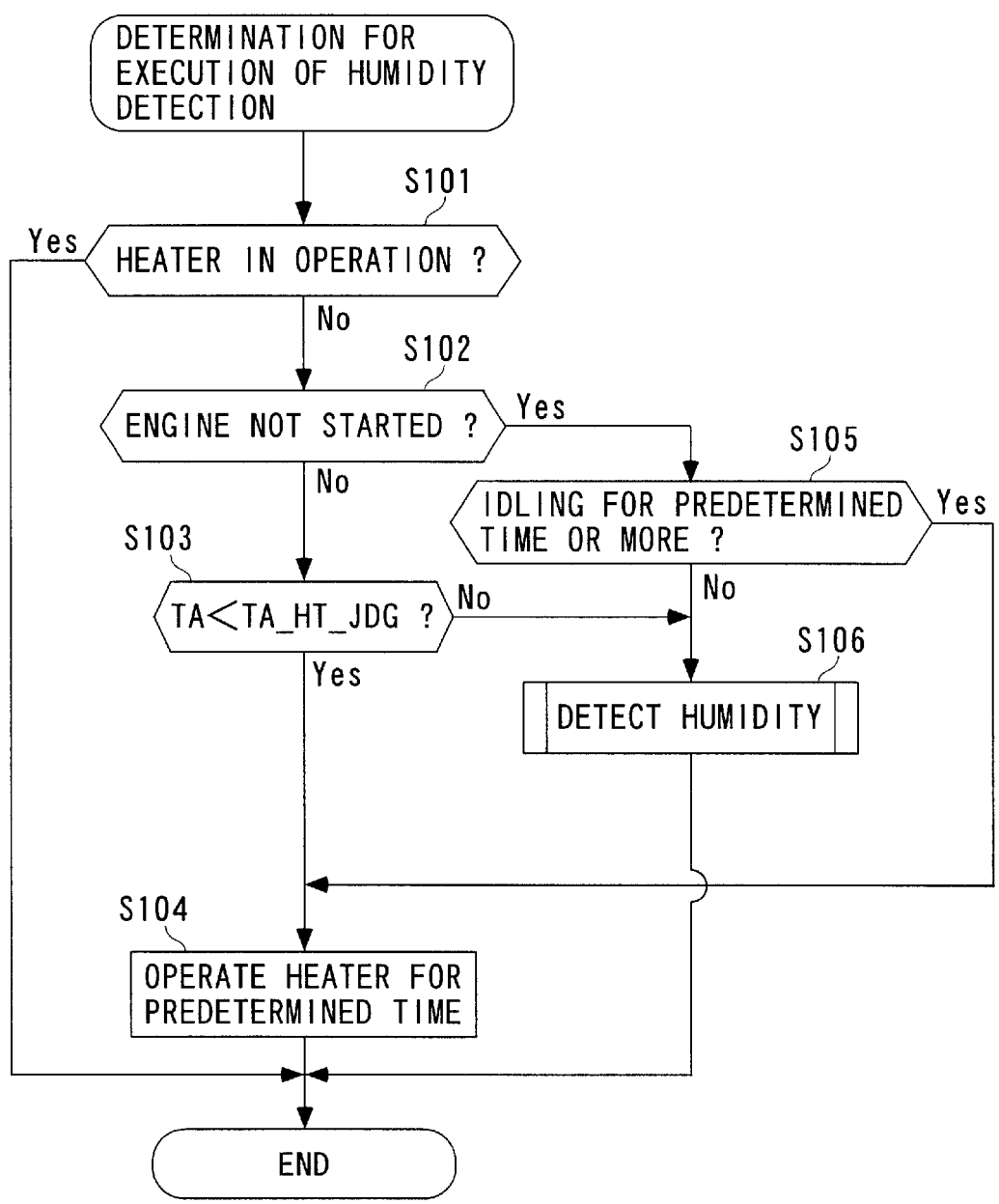
FIG. 11 is a flow chart illustrating steps involved in determining whether or not a humidity detection is performed.

Next, the control operations executed by the ECU 25 will be described specifically with reference to FIGS. 11 to 21. FIG. 11 illustrates steps involved in determining whether or not humidity detection is performed. The illustrated program is immediately initiated when an ignition switch is turned on to start the engine 1. First, in this program, it is determined at step 101 (indicated by "S101" in FIG. 11 and the subsequent drawings as well) whether or not the heater 28 for heating the humidity sensor 22 is operating. If the result of the determination at this step 101 is Yes, i.e., if the heater 28 is operating, this program is terminated at this time. On the other hand, if the result of the determination at step 101 is No, i.e., if the heater 28 is not operating, the program proceeds to subsequent step 102, wherein it is determined whether or not the engine 1 is not started, more specifically, whether or not cranking is not started. If the result of the determination at this step 102 is No, i.e., if the engine 1 is not yet started, the program proceeds to subsequent step 103, where it is determined whether or not an intake air temperature TA detected by the intake air temperature sensor 27 is lower than a predetermined determination value TA_HT_JDG (for example, 50° C.).

If the result of the determination at step 103 is Yes, i.e., if the intake air temperature TA is lower than the determination value TA_HT_JDG, the heater 28 is operated for a predetermined time (for example, 10 seconds) (step 104), followed by the termination of the program. The heater 28 is controlled in the foregoing manner for the following reason. When an ambient temperature is low at the start of the engine 1, dew condensation is likely to occur on the sensor element 22a of the humidity sensor 22. If the humidity is to be detected in this state, the true value cannot be accurately detected, so that water droplets due to the dew condensation are removed from the sensor element 22a by operating the heater 28. On the other hand, if the result of the determination at step 103 is No, i.e., if the intake air temperature TA is equal to or higher than the determination value TA_HT_JDG, humidity detection at step 106, later described, is performed, assuming that dew condensation is unlikely to occur on the sensor element 22a, followed by the termination of the program.

On the other hand, if the result of the determination at step 102 is Yes, i.e., if the engine 1 has been started, the program proceeds to subsequent step 105, where it is determined whether or not engine 1 is idling for a predetermined time (for example, 10 seconds) or more. Since continued idling for the predetermined time or more may cause dew condensation on the sensor element 22a of the humidity sensor 22, the heater 28 is operated for the predetermined time in a manner similar to the foregoing in order to remove water droplets from the sensor element 22a (step 104) when the result of the determination at step 105 is Yes, followed by the termination of the program. If the result of the determination at step 105 is No, i.e., if the idling is continuing for less than the predetermined time, the program proceeds to step 106.

Figure 12:
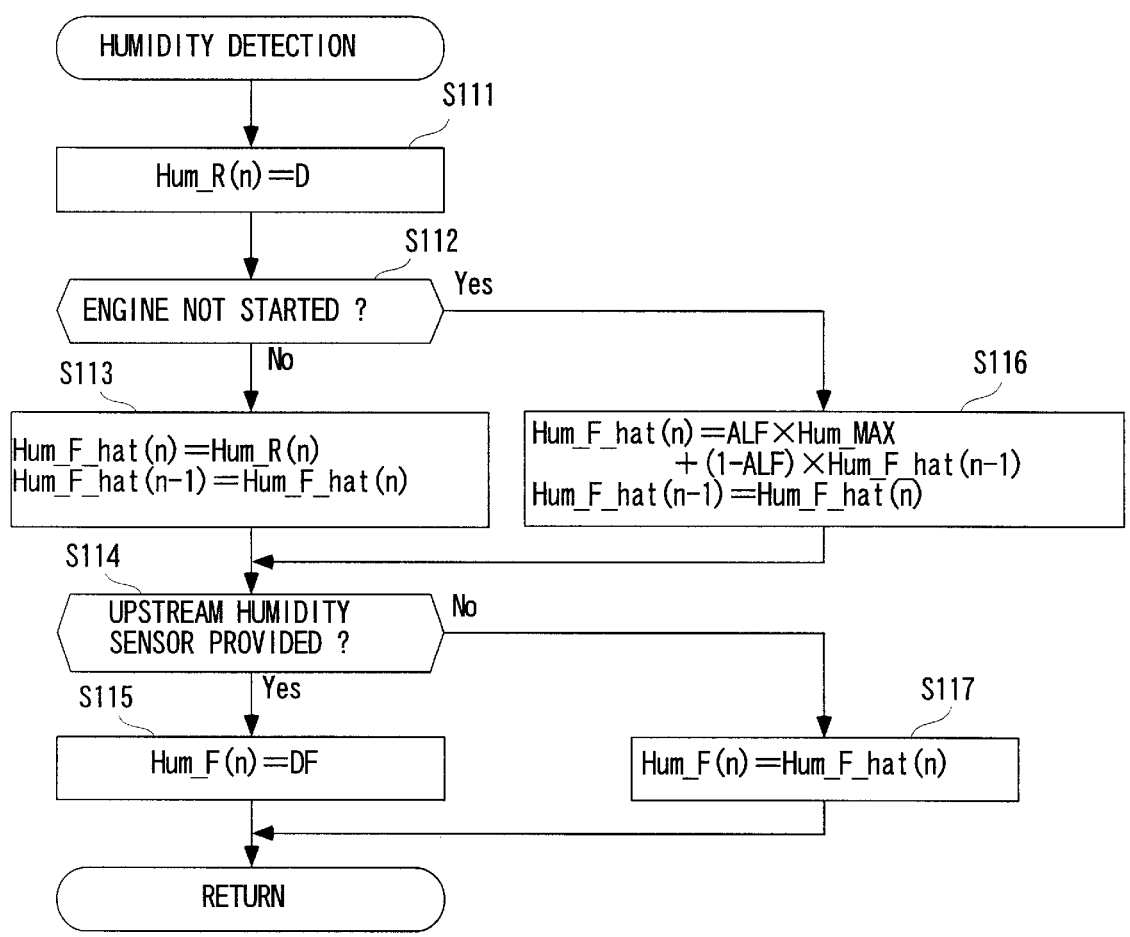
FIG. 12 is a flow chart illustrating steps involved in the humidity detection.

FIG. 12 illustrates steps involved in the humidity detection performed at step 106 based on the result of detection by the humidity sensor 22. In the illustrated program, first, at step 111, a detection value D detected by the downstream humidity sensor 22A is set as a current value Hum_R(n) of the downstream humidity.

Next, it is determined at step 112 whether or not the engine 1 is not yet started. If the result of the determination at this step 112 is No, i.e., if the engine 1 is not yet started, a current value Hum_F_hat(n) of the estimated upstream humidity is set to the downstream humidity Hum_R(n), at subsequent step 113, which has been set at step 111. Since exhaust gases from the engine 1 have not flown into the bypass exhaust passage 14 before the start of the engine 1, the downstream humidity Hum_R(n) is used as it is as the estimated upstream humidity Hum_F_hat(n). Also, at step 113, the previous value Hum_F_hat(n-1) of the estimated upstream humidity is set to the current value Hum_F_hat(n).

Subsequently, it is determined at step 114 whether or not the upstream humidity sensor 22B is provided. When the upstream humidity sensor 22B is provided at a location upstream of the HC adsorbent 16 as indicated by two-dot chain lines in FIGS. 9 and 10, a detection value DF detected thereby is set as a current value Hum_F(n) of the upstream humidity (step 115), followed by the termination of the program. On the other hand, if the upstream humidity sensor 22B is not provided (No at step 114), the program proceeds to step 117, wherein the estimated upstream humidity Hum_F_hat(n) set at step 113 or calculated at step 116, later described, is set as the upstream humidity Hum_F(n), followed by the termination of the program.

If the result of the determination at step 112 is No, i.e., after the engine 1 has been started, the program proceeds to step 116, wherein the current value Hum_F_hat(n) of the estimated upstream humidity is calculated by the following equation (1) using a maximum humidity Hum_MAX which is a maximum value of the relative humidity and the previous value Hum_F_hat(n-1) of the estimated upstream humidity (step 116):

$$Hum\_F\_hat(n) = ALF \times Hum\_MAX + (1-ALF) \times Hum\_F\_hat(n-1) \quad (1)$$

where ALF is a weighting factor derived from experiments, and takes a value in a range of 0<ALF<1.0. Also, at step 116, together with the foregoing calculation, the previous value Hum_F_hat(n-1) of the estimated upstream humidity is set to the estimated upstream humidity Hum_F_hat(n) upon the current execution of the program. Then, the program proceeds to the aforementioned step 114.

As described above, in the humidity detection, when the upstream humidity sensor 22B is provided, the detection value DF of the upstream humidity sensor 22B is used as the current value Hum_F(n) of the upstream humidity. On the contrary, if the upstream humidity sensor 22B is not provided, the estimated upstream humidity Hum_F_hat(n), estimated at step 113 or 116 based on the detection value D of the downstream humidity sensor 22A, is used instead.

Figure 13:
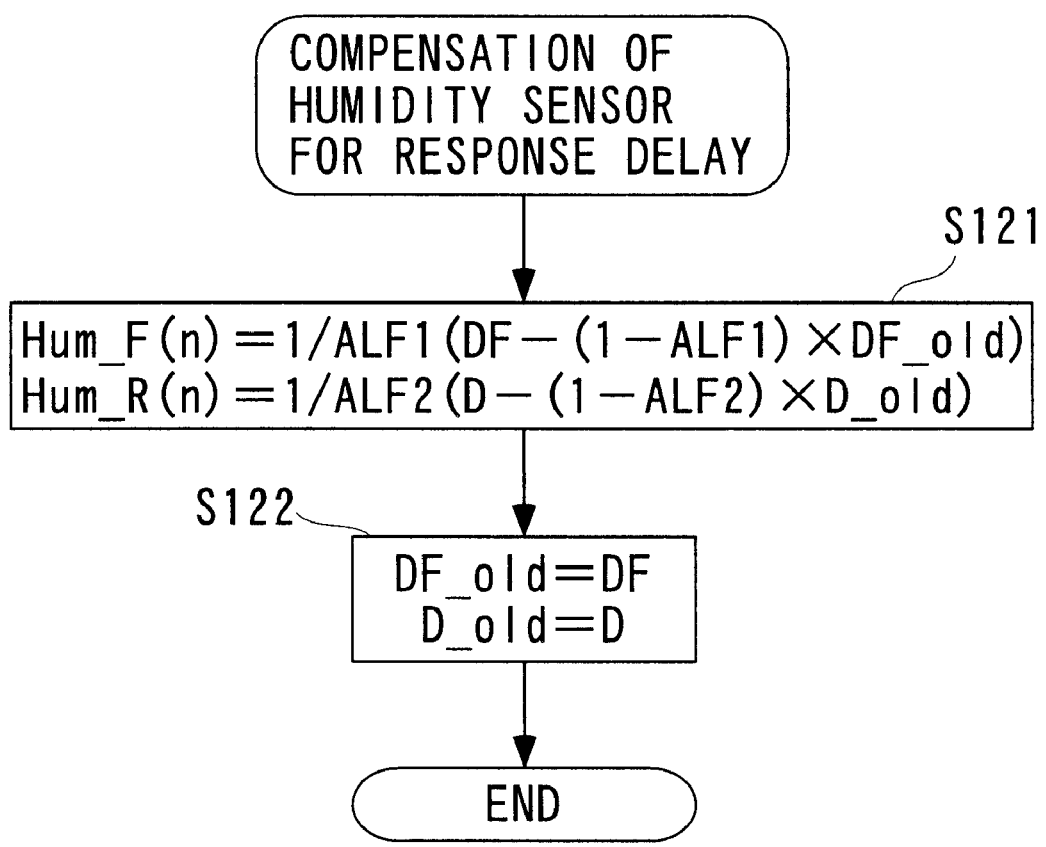
FIG. 13 is a flow chart illustrating steps involved in compensating a humidity sensor for a response delay.

Also, if both humidity sensors 22A, 22B have a low responsibility, a response delay occurs in the detection values D, DF, so that the program illustrated in FIG. 13 is executed for compensating for the response delay of the humidity sensor 22. As illustrated in FIG. 13, the compensation involves calculating the upstream humidity Hum_F(n) and the downstream humidity Hum_R(n) by the following equations (2) and (3), respectively, using the current detection values D, DF and the previous detection values D_old, DF_old:

$$Hum\_F(n) = 1/ALF1(DF-(1-ALF1) \times DF\_old) \quad (2)$$

$$Hum\_R(n) = 1/ALF2(D-(1-ALF2) \times D\_old) \quad (3)$$

where ALF1 and ALF2 are correction coefficients for compensating for response delays, which are derived from experiments for respective humidity sensors 22 of different specifications, and take a value in a range of 0<ALF1<1.0 or 0<ALF2<1.0. For example, as will be understood from the fact that the equation (2) can be re-written as:

$$Hum\_F(n) = 1/ALF1(DF-DF\_old)DF\_old,$$

the degree of compensation is smaller as the correction coefficients ALF1, ALF2 are larger, and the upstream humidity Hum_F(n) and the downstream humidity Hum_R(n) infinitely approach the current values DF, D as these values are closer to one. On the other hand, as the correction coefficients ALF1, ALF2 are smaller, the degree of compensation is larger.

Next, at step 122, the current values DF and D are set as the previous values DF_old and D_old, respectively, for using them as the previous values in the next compensation, followed by the termination of the program. When both humidity sensors 22A, 22B have a high responsibility, their respective detection values D, DF are used as they are as the downstream humidity Hum_R(n) and the upstream humidity Hum_F(n), respectively, so that the foregoing compensation is omitted.

Figure 14A:
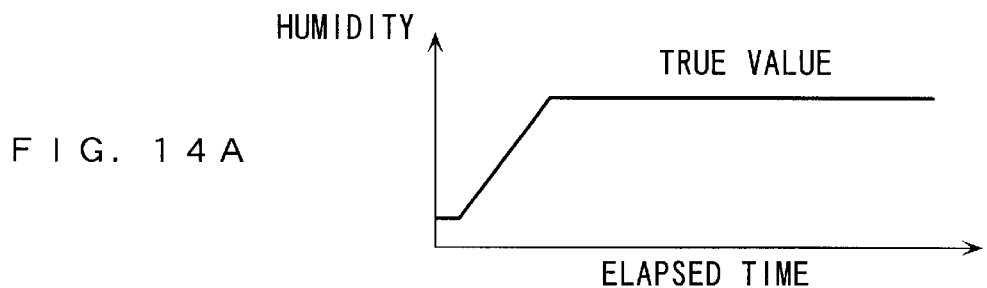
Figure 14B:
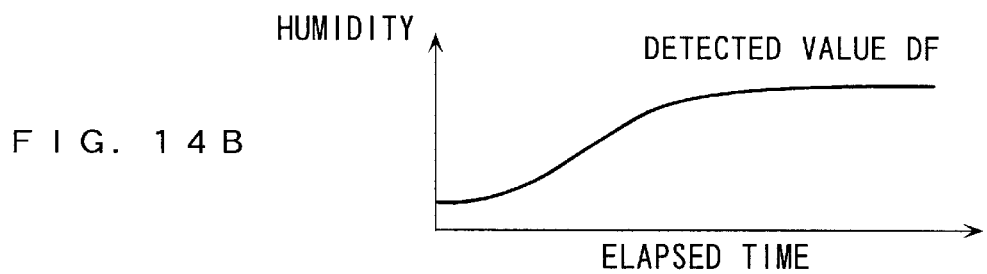
Figure 14C:
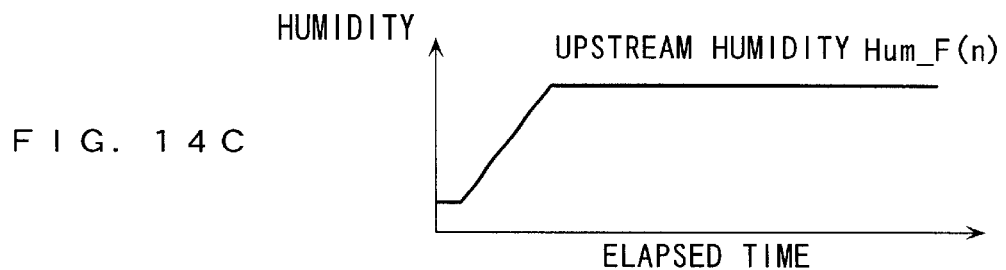

FIGS. 14A, 14B, 14C show exemplary transitions of an actual humidity (true value) detected for the humidity at a location upstream of the HC adsorbent 16; the detection value DF of the upstream humidity sensor 22B; and the upstream humidity Hum_F(n) after the detection value DF has been compensated for. As illustrated in FIG. 14A, assuming, for example, that the humidity of exhaust gases transitions such that it rises immediately after the start of the engine 1, and subsequently takes a substantially constant value, if the humidity is detected by a humidity sensor having a low responsibility, the detection value DF transitions with a delay from the true value, as shown in FIG. 14B. On the other hand, since the upstream humidity Hum_F(n) is calculated by the aforementioned equation (2), this humidity transitions substantially at the same timing as the true value, so that this value can be used to compensate for the response delay of the upstream humidity sensor 22B.

When the upstream humidity sensor 22B is not provided, a proper upstream humidity Hum_F(n), which has a response delay compensated, can be derived, for example, using the compensated downstream humidity Hum_R(n) calculated at step 121 in FIG. 13 at steps 113, 116 in FIG. 12.

Figure 15:
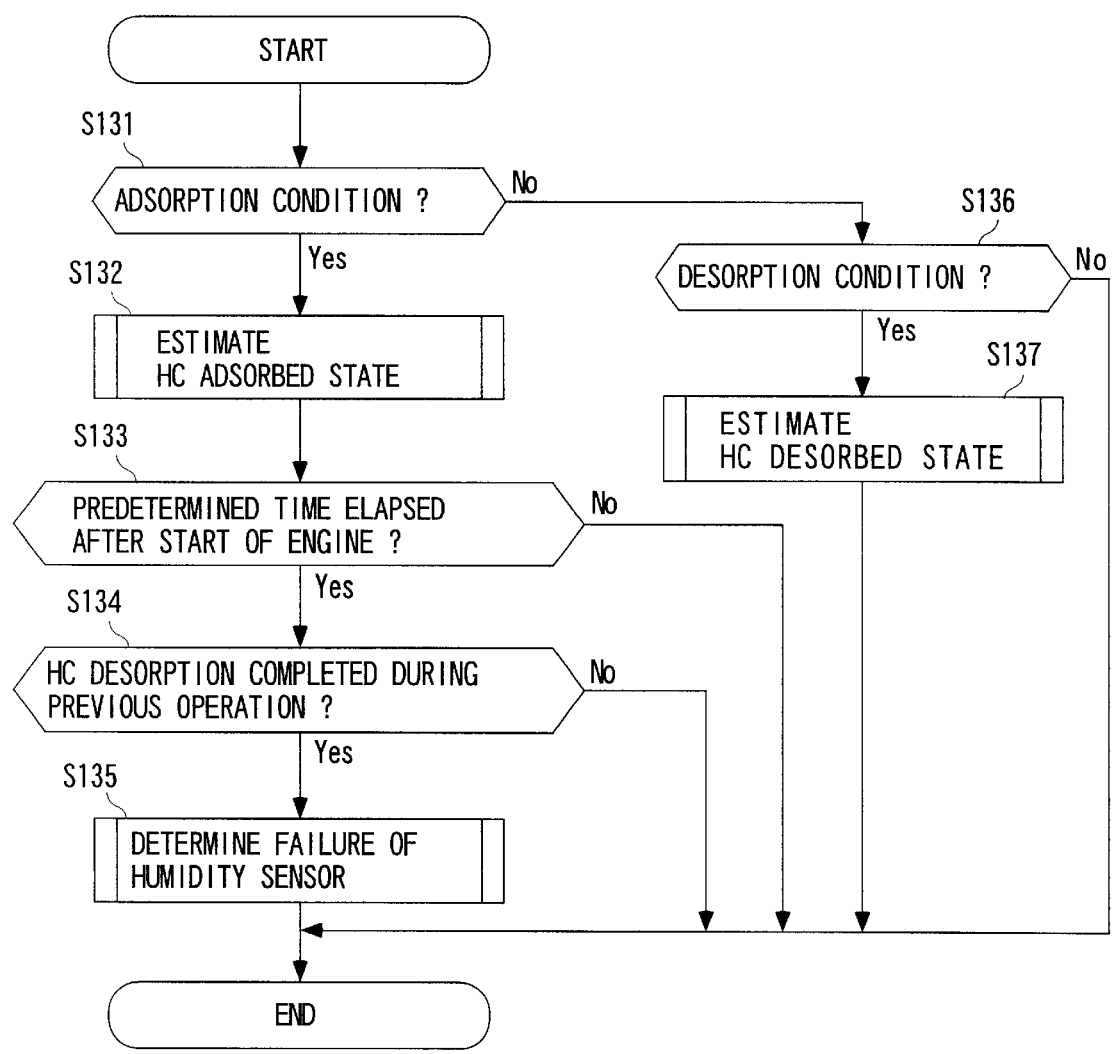
FIG. 15 is a flow chart illustrating steps involved in estimating adsorbed and desorbed states of hydrocarbons in an HC adsorbent, and determining a failure of a humidity sensor.

FIG. 15 illustrates a main flow chart of a sequence of steps involved in estimating an adsorbed state and a desorbed state of hydrocarbons in the HC adsorbent 16 and determining a failure of the humidity sensor 22. The illustrated program is executed, for example, in synchronism with a TDC signal from a crank angle sensor 32 inputted to the ECU 25. In this program, it is first determined whether or not the hydrocarbon adsorption condition the has been established for HC adsorbent 16 (step 131). Specifically, it is determined whether or not the valve body 15a of the switching valve 15 closes the main exhaust passage 13 and opens the bypass exhaust passage 14, in other words, the valve body 15a of the switching valve 15 introduces exhaust gases from the engine 1 to the bypass exhaust passage 14, as indicated by two-dot chain lines in FIG. 10.

Figure 16:
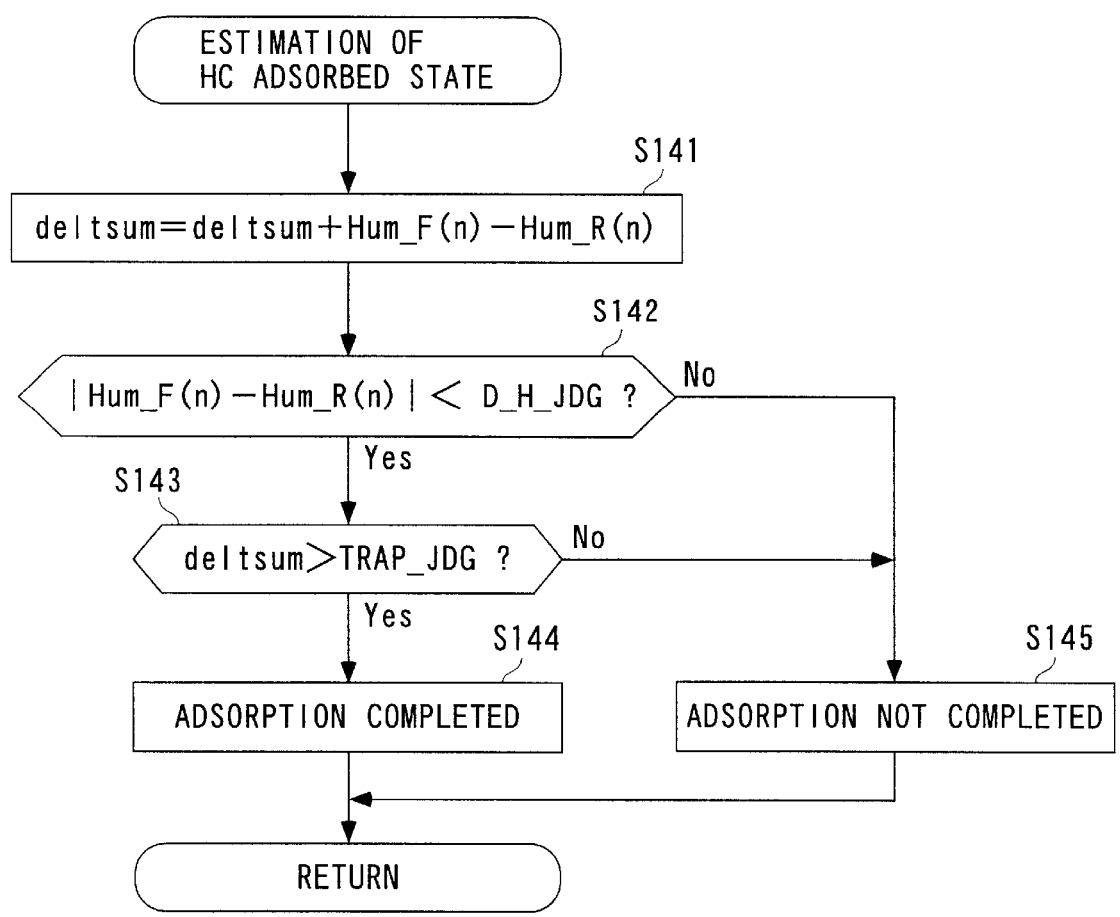
FIG. 16 is a flow chart illustrating steps involved in estimating a hydrocarbon adsorbed state.

If the result of the determination at step 131 is Yes, i.e., if the adsorption condition has been established, the flow proceeds to step 132 to execute a subroutine for estimating an HC adsorbed state. FIG. 16 illustrates steps of the subroutine for estimating an HC adsorbed state. This subroutine estimates a hydrocarbon adsorbed state in the HC adsorbent 16. First, in the subroutine, a differential cumulative value deltsum between both humidities is calculated by the following equation (4) using the upstream humidity Hum_F(n) and the downstream humidity Hum_R(n) which have been calculated in the humidity detection of FIG. 12 (step 141):

$$deltsum = deltsum + Hum\_F(n) - Hum\_R(n) \quad (4)$$

Figure 17:
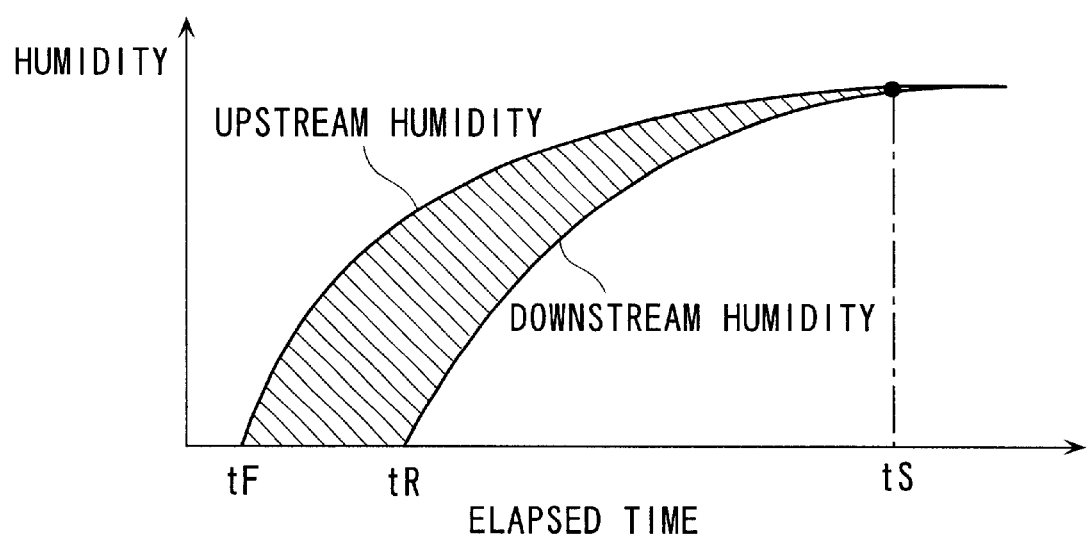
FIG. 17 is a time chart showing exemplary transitions of an upstream humidity and a downstream humidity from the start of the engine.

As the engine 1 is started, the upstream humidity and the downstream humidity generally transition as shown in FIG. 17. More specifically, the upstream humidity rises earlier than the downstream humidity (at time tF), and gradually increases over time, and eventually converges to a constant value. The downstream humidity, on the other hand, rises with a delay from the upstream humidity (at time tR) after the upstream humidity has increased to a certain level, and subsequently transitions to gradually increase. At the time hydrocarbons have been fully adsorbed in the HC adsorbent 16 (at time tS), the downstream humidity converges to a value substantially identical to the upstream humidity. Therefore, by repeatedly executing this subroutine, the differential cumulative value deltsum, i.e., the area of a hatched portion indicated in FIG. 17 is calculated by the equation (4). The resulting value corresponds to the amount of moisture adsorbed by the HC adsorbent 16. The amount of adsorbed moisture is proportional to the amount of hydrocarbons adsorbed by the HC adsorbent 16 and has a high correlation to this.

Next, the subroutine proceeds to step 142, wherein it is determined whether or not the absolute value of a difference between the upstream humidity Hum_F(n) and the downstream humidity Hum_R(n) is smaller than a predetermined determination value D_H_JDG (for example, 10%). If the result of the determination at this step 142 is No, it is determined that the adsorption of hydrocarbons in the HC adsorbent 16 has not been completed, assuming that there is a large deviation between the upstream humidity Hum_F(n) and the downstream humidity Hum_R(n) (step 145), followed by the termination of the program. On the other hand, if the result of the determination at step 142 is Yes, i.e., if there is a small deviation of the upstream humidity Hum_F(n) from the downstream humidity Hum_R(n), the program proceeds to step 143.

At step 143, it is determined whether or not the differential cumulative value deltsum calculated at the aforementioned step 141 is larger than a predetermined determination value TRAP_JDG (for example, 2000%). If the result of the determination at this step 143 is No, it is determined that the adsorption of hydrocarbons in the HC adsorbent 16 has not been completed, assuming that the differential cumulative value deltsum is small (step 145), followed by the termination of the program. On the other hand, if the result of the determination at step 143 is Yes, i.e., if the differential cumulative value deltsum exceeds the determination value TRAP_JDG, it is determined that the adsorption of hydrocarbons in the HC adsorbent 16 has been completed (step 144), followed by the termination of the program.

In the foregoing manner, in this estimation, it is determined that the adsorption of hydrocarbons in the HC adsorbent 16 has been completed when the deviation of the upstream humidity Hum_F(n) from the downstream humidity Hum_R(n) is smaller than the determination value D_H_JDG and the differential cumulative value deltsum is larger than the determination value TRAP_JDG. As described above, the deviation becomes gradually smaller from the start of the engine 1 toward the completion of the adsorption of hydrocarbons in the HC adsorbent 16, while the differential cumulative value deltsum has a high correlation to the amount of hydrocarbons adsorbed in the HC adsorbent 16. It is therefore possible, by executing the subroutine as described above, to correctly determine the hydrocarbon adsorbed state in the HC adsorbent 16, i.e., the completion of the adsorption of hydrocarbons in the HC adsorbent 16 based on the result of the detection made by the downstream humidity sensor 22A, or based on the result of the detection made by the upstream humidity sensor 22B in addition to the downstream humidity.

Turning back to FIG. 15, at step 133 subsequent to the estimation of the HC adsorbed state at the aforementioned step 132, it is determined whether or not a predetermined time (for example, 10 seconds) has elapsed from the start of the engine 1. Then, it is determined whether or not desorption of hydrocarbons in the HC adsorbent 16, later described, had been completed during the previous operation of the engine 1 (at the end of the previous operation) (step 134). If the result of the determination at either of these steps is No, the program is terminated, assuming that a condition for performing a failure determination for the humidity sensor 22 has not been established. On the other hand, if the results of the determinations at both steps 133, 134 are Yes, the failure determination is made, assuming that the condition for performing the failure determination for the humidity sensor 22 has been established (step 135).

The determinations at steps 133 and 134 are made for performing the failure determination for the humidity sensor 22 as described above for the following reason. First, it is determined at step 133 whether or not a predetermined time has elapsed after the start of the engine 1 because the adsorption of hydrocarbons in the HC adsorbent 16 approaches the completion when a certain time has elapsed from the start of the engine 1, so that the value detected by the humidity sensor 22 is stabilized to a substantially constant value (see FIGS. 17 and 19B). Thus, an appropriate determination can be carried out by performing the failure determination for the humidity sensor 22 after the detected value has been stabilized. On the other hand, it is determined at step 134 whether or not the desorption of hydrocarbons in the HC adsorbent 16 had been completed during the previous operation of the engine 1 because a transition of the value detected by the humidity sensor 22 changes, if the desorption of hydrocarbons in the HC adsorbent 16 had been completed during the previous operation of the engine 1, thereby causing a shift in timing of properly performing the failure determination. Thus, the failure determination is not performed in such a case. Instead, the failure determination is performed only when the desorption of hydrocarbons had been completed during the previous operation of the engine 1 to avoid an erroneous determination.

Figure 18:
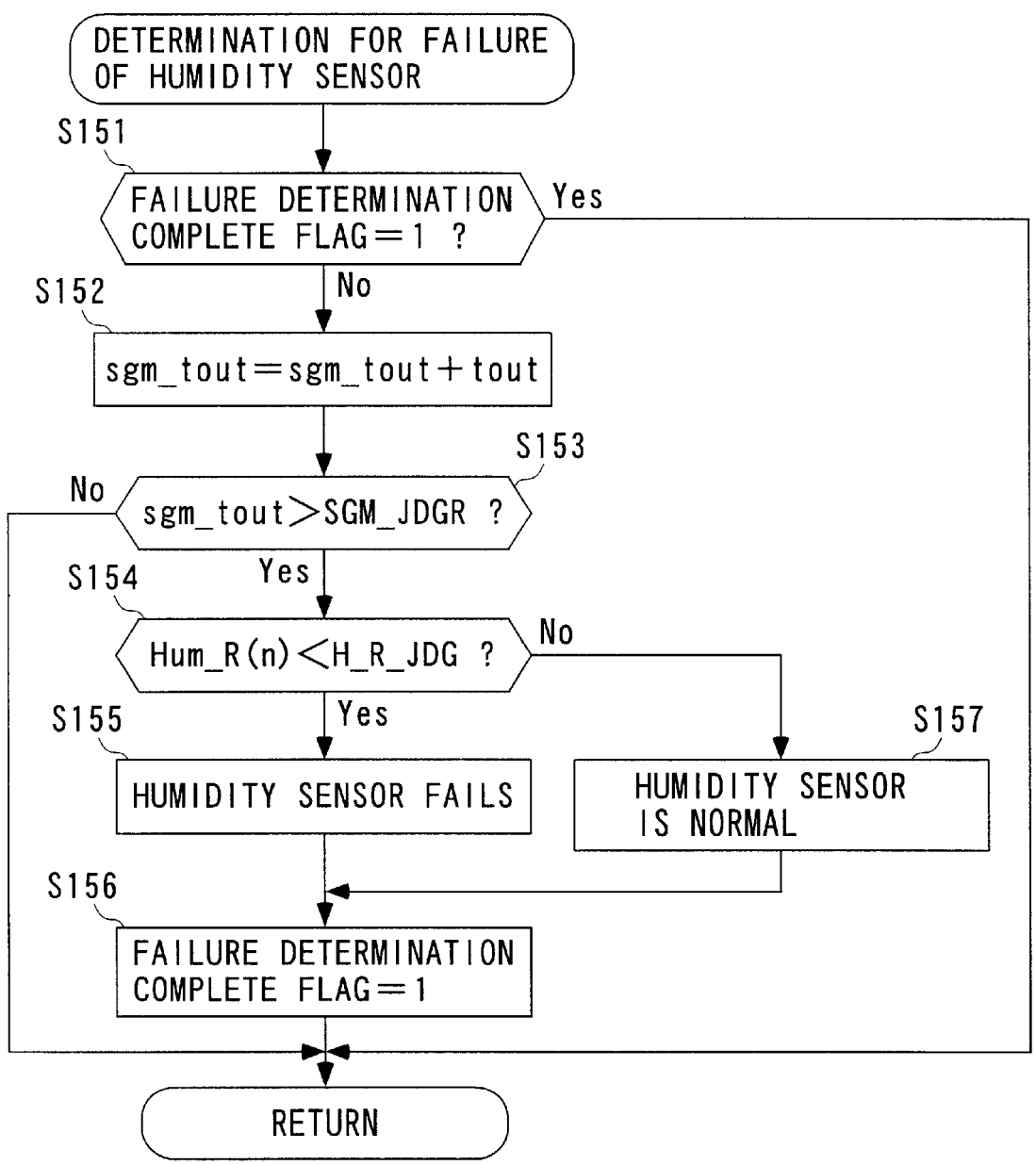
FIG. 18 is a flow chart illustrating steps involved in determining a failure of a humidity sensor.
Figure 19:
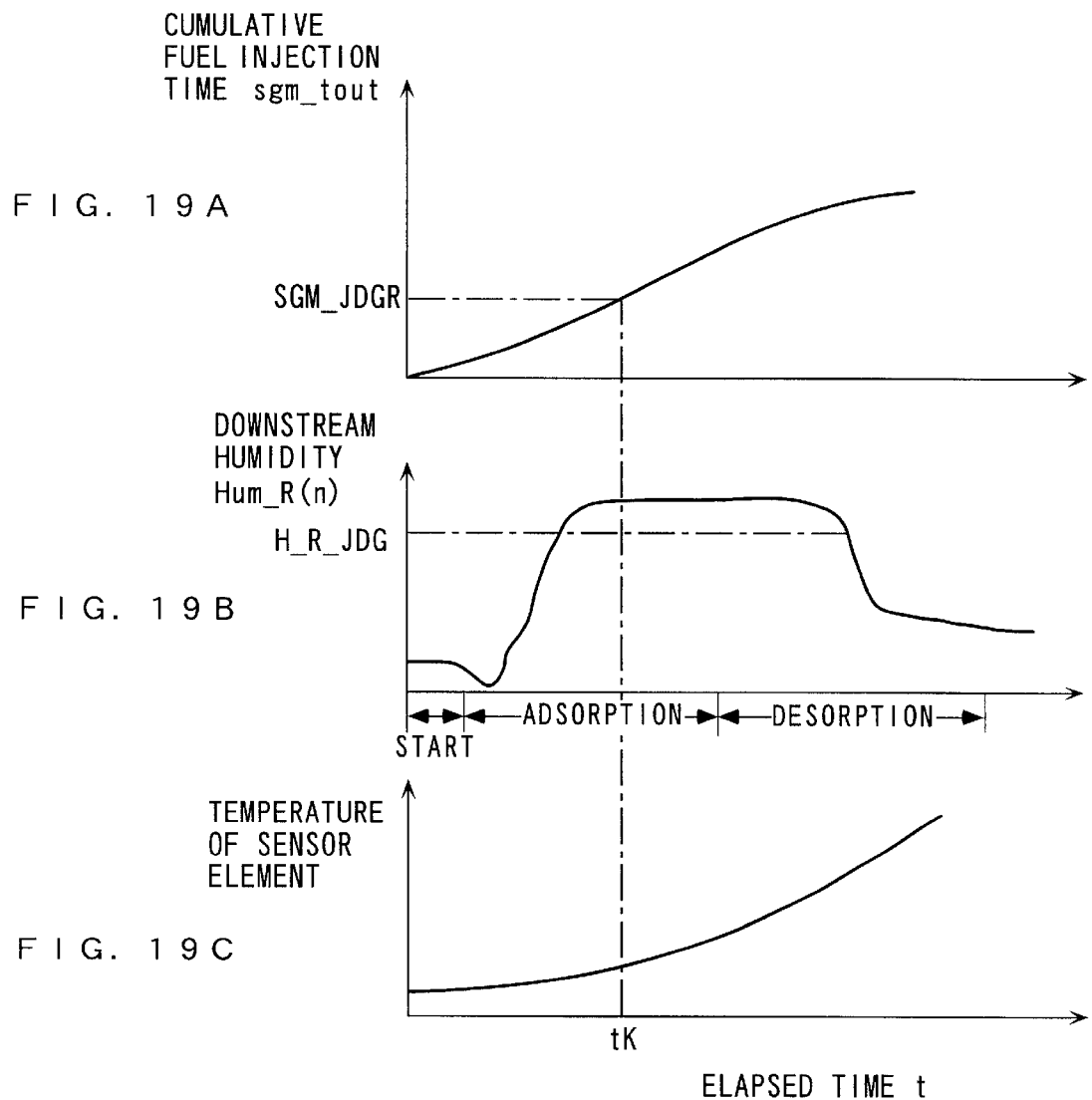

FIG. 18 illustrates a subroutine of the failure determination performed at the aforementioned step 135. This subroutine involves a determination as to the presence or absence of a failure of the downstream humidity sensor 22A. In this subroutine, first, it is determined at step 151 whether or not a failure determination complete flag is set to "1." This failure determination complete flag is reset to "0" when the ignition switch is turned on, and set to "1" at step 156, later described, upon completion of the failure determination for the downstream humidity sensor 22A. If the result of the determination at step 151 is Yes, i.e., if the failure determination complete flag is set to "1," the subroutine is terminated at this time. In this way, when the failure determination for the downstream humidity sensor 22A has once been completed, the failure determination is omitted afterwards. In other words, the failure determination is performed only once at the start of the engine 1.

If the result of the determination at step 151 is No, i.e., if the failure determination for the downstream humidity sensor 22A has not been completed in this subroutine, a cumulative value sgm_tout is calculated by the following equation (5) using a fuel injection time tout of all cylinders of the engine 1 (step 152):

$$sgm\_tout = sgm\_tout + tout \quad (5)$$

This equation (5) estimates the total calory provided from the engine 1 to the exhaust system 2 from the start.

Next, it is determined whether or not the calculated cumulative value sgm_tout is larger than a predetermined determination value SGM_JDGR assigned thereto (step 153). If the result of the determination at this step 153 is No, meaning that the total calory is small, the program is terminated without performing the failure determination for the downstream humidity sensor 22A, assuming that the temperature at the sensor element 22a of the downstream humidity sensor 22A has not been sufficiently elevated.

On the other hand, if the result of the determination at step 153 is Yes, the program proceeds to step 154, assuming that the temperature at the sensor element 22a has been sufficiently elevated, wherein it is determined whether or not the downstream humidity Hum_R(n) is smaller than a determination value H_R_JDG (for example, 90%). As shown in FIG. 19A, the cumulative value sgm_tout increases from the start of the engine 1 over time, and at the time the cumulative value sgm_tout exceeds the determination value SGM_JDGR (at time tK), the temperature at the sensor element 22a has been sufficiently elevated, and the adsorption of hydrocarbons in the HC adsorbent 16 has been completed or is close to the completion, so that the downstream humidity Hum_R(n) remains at a substantially constant value. The determination value H_R_JDG is set to a predetermined value slightly lower than this constant value. Therefore, if the result of the determination at step 154 is No, i.e., if the downstream humidity Hum_R(n) is equal to or higher than the determination value H_R_JDG, it is determined that the downstream humidity sensor 22A is normal (step 157). On the contrary, if the result of the determination is Yes, i.e., if the downstream humidity Hum_R(n) is lower than the determination value H_R_JDG, it is determined that the downstream humidity sensor 22A fails (step 155). Then, the failure determination complete flag is set to "1" (step 156), followed by the termination of the subroutine.

With the foregoing subroutine, it is possible to correctly determine a failure of the downstream humidity sensor 22A based on the result of the detection made by itself. When the upstream humidity sensor 22B is provided, the failure determination therefor can be performed in a manner similar to the failure determination for the downstream humidity sensor 22A only by changing the magnitudes of the two determination values (SGM_JDGR, H_R_JDG).

Figure 20:
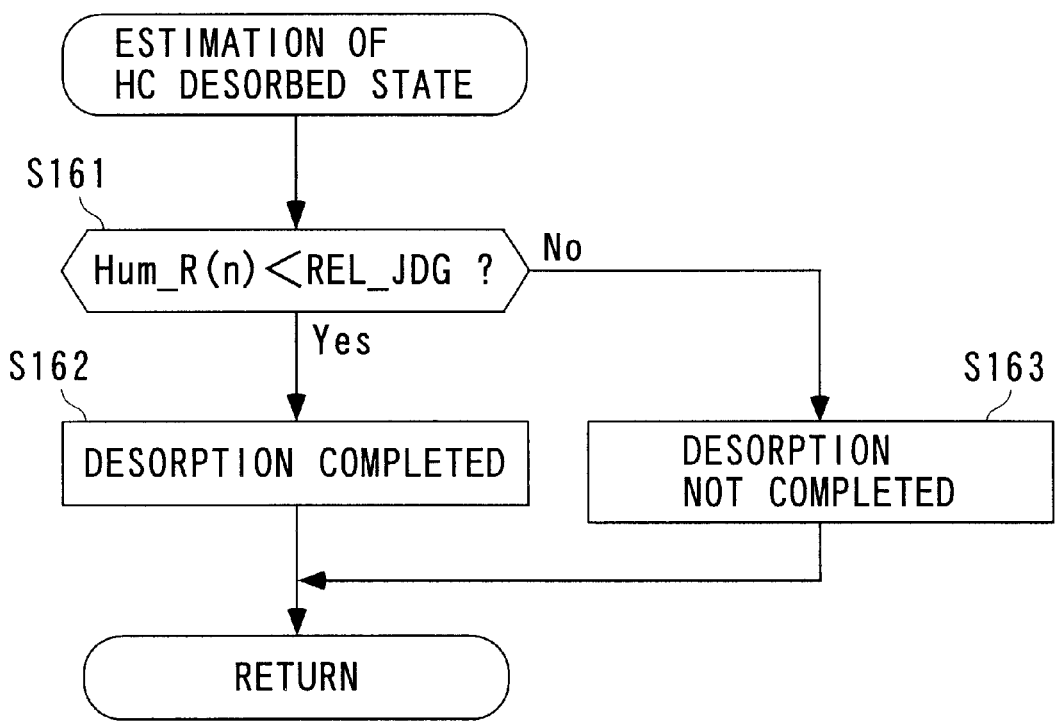
FIG. 20 is a flow chart illustrating steps involved in estimating an HC desorbed state.

Turning back to FIG. 15, if the result of the determination at step 131 is No, i.e., if the adsorption condition is not established, the program proceeds to step 136, where it is determined whether or not the a condition for desorption of hydrocarbons by the HC adsorbent 16 has been established. Specifically, it is determined whether or not EGR is in progress. If the result of the determination at this step 136 is Yes, i.e., if the desorption condition has been established, the program proceeds to step 137, where the HC desorbed state is estimated. FIG. 20 illustrates a subroutine for estimating the HC desorbed state. This subroutine involves estimating the state of hydrocarbons desorbed from the HC adsorbent 16. In this subroutine, it is determined at step 161 whether not the downward humidity Hum_R(n) is lower than a predetermined determination value REL_JDG (for example, 15%).

As shown in FIG. 19B, as the desorption of hydrocarbons from the HC adsorbent 16 begins, the downstream humidity Hum_R(n) initially holds a substantially constant value since moisture is also desorbed from the HC adsorbent 16 together with hydrocarbons. Subsequently, as the amount of moisture remaining in the HC adsorbent 16 is reduced, the amount of desorbed moisture is also reduced, so that the downstream humidity Hum_R(n) becomes lower. Therefore, if the result of the determination at step 161 is Yes, i.e., if the downward humidity HumR(n) is smaller than a determination value REL_JDG, it is determined that the downstream humidity Hum_R(n) is small and hence the desorption of hydrocarbons from the HC adsorbent 16 has been completed (step 162), followed by the termination of the subroutine. On the other hand, if the result of the determination at step 161 is No, i.e., if the downstream humidity Hum_R(n) is equal to or higher than the determination value REL_JDG, it is determined that the desorption of hydrocarbons has not been completed (step 163), followed by the termination of the subroutine.

With the foregoing estimation, it is possible to correctly determine the completion of the desorption of hydrocarbons from the HC adsorbent 16 based on the result of the detection made by the downstream humidity sensor 22A.

FIG. 21 illustrates a flow chart of switching valve control for selectively switching the exhaust passage between the main exhaust passage 13 and the bypass exhaust passage 14. In the illustrated program, it is determined at step 171 whether or not the adsorption of hydrocarbons in the HC adsorbent 16 has been completed. This determination is made based on whether or not the aforementioned step 144 in FIG. 16 is being executed. If the result of the determination at step 171 is No, the switching valve 15 is maintained in the current state since the adsorption of hydrocarbons in the HC adsorbent 16 has not been completed but is still in progress. Specifically, the main exhaust passage 13 is closed by the valve body 15a of the switching valve 15, and the bypass exhaust passage is held open (step 173).

On the other hand, if the result of the determination at step 171 is Yes, the absorption of hydrocarbons in the HC adsorbent 16 has been completed, so that the switching valve 15 is switched to open the main exhaust passage 13 and close the bypass exhaust passage (step 172). Subsequently, the EGR is performed through an EGR pipe 17 to desorb hydrocarbons from the HC adsorbent 16.

With the foregoing program, it is possible to control the switching of the switching valve 15 at a proper timing based on the determination as to whether or not the adsorption of hydrocarbons in the HC adsorbent 16 has been completed.

As described above in detail, according to the second embodiment, by detecting the downstream humidity which has a high correlation to an actual adsorbed state of hydrocarbons in the HC adsorbent 16, it is possible to accurately detect an adsorbed state and a desorbed state of hydrocarbons in the HC adsorbent 16. Also, by compensating the humidity sensor 22 for a response delay, it is possible to correctly detect the state of the HC adsorbent 16 even with the humidity sensor 22 which exhibits a low responsibility, while properly compensating such the humidity sensor 22 for the response delay. Further, by heating the sensor element 22a of the humidity sensor 22 by the heater 28 in accordance with an operating state of the engine 1, it is possible to bring the sensor element 22a into a state suitable for detecting the humidity. As a result, the humidity can be correctly detected while avoiding inconveniences, for example, dew condensation on the sensor element 22a, coke deposition on the sensor element 22a, and so on.

It will be appreciated that the present invention is not limited to the respective embodiments described above, but may be implemented in a variety of manners. For example, while each of the foregoing embodiments comprises the catalyzer 6 having a three-way catalyst 5 and the hydrocarbon adsorbent catalyzer 7 having the HC adsorbent 16, arranged separately in the exhaust pipe 4 as exhaust gas purifying catalysts, the present invention can be applied to a so-called hybrid exhaust gas purifying catalyst which incorporates the two catalyzers. It is also possible to integrate the humidity sensor 22 and an air/fuel ratio sensor into a single housing.

As described above in detail, the catalyst state detector for an exhaust gas purifying catalyst according to the present invention is advantageous in that it can accurately detect a state of an adsorbent in an exhaust gas purifying catalyst for adsorbing hydrocarbons, including deterioration, it can be manufactured at a low cost, and so on.

What is claimed is:

1. A catalyst state detector for detecting deterioration of an adsorbent capable of adsorbing hydrocarbons and moisture in exhaust gases of an internal combustion engine, said adsorbent being contained in an exhaust gas purifying catalyst arranged at an intermediate portion of an exhaust pipe in said internal combustion engine, said catalyst state detector comprising:
   a downstream humidity sensor arranged at a location downstream of said adsorbent in said exhaust pipe for detecting a humidity of the exhaust gases; and
   adsorbent deterioration detecting means for detecting deterioration of said adsorbent in accordance with a result of a detection made by said downstream humidity sensor.

2. A catalyst state detector according to claim 1, wherein said adsorbent deterioration detecting means detects the deterioration of said adsorbent based on a transition of a result of detection made by said downstream humidity sensor from a start of said internal combustion engine.

3. A catalyst state detector according to claim 2, further comprising:
   atmospheric state detecting means for detecting an atmospheric state; and
   deterioration detection execution determining means for determining whether or not said adsorbent deterioration detecting means should perform the deterioration detection based on results of detections made by said atmospheric state detecting means and said downstream humidity sensor at the start of said internal combustion engine.

4. A catalyst state detector according to claim 2, wherein said adsorbent comprises zeolite.

5. A catalyst state detector for detecting a state of an adsorbent capable of adsorbing hydrocarbons and moisture in exhaust gases of an internal combustion engine, said adsorbent being contained in an exhaust gas purifying catalyst arranged at an intermediate portion of an exhaust pipe in said internal combustion engine, said catalyst state detector comprising:
   a downstream humidity sensor arranged at a location downstream of said adsorbent in said exhaust pipe for detecting a humidity of the exhaust gases;
   adsorbent state detecting means for detecting a state of said adsorbent in accordance with a result of a detection made by said downstream humidity sensor; and
   upstream humidity detecting means for detecting a humidity of the exhaust gases at a location upstream of said adsorbent,
   wherein said adsorbent state detecting means detects the state of said adsorbent in accordance with the upstream humidity detected by said upstream humidity detecting means.

6. A catalyst state detector according to claim 5, wherein said upstream humidity detecting means estimates said upstream humidity based on the result of the detection made by said downstream humidity sensor.

7. A catalyst state detector according to claim 5, wherein said upstream humidity detecting means is arranged at a location upstream of said adsorbent in said exhaust pipe, and comprises an upstream humidity sensor for detecting said upstream humidity.

8. A catalyst state detector according to claim 7, further comprising response delay compensating means for compensating at least one of said downstream humidity sensor and said upstream humidity sensor for a response delay.

9. A catalyst state detector according to claim 7 or 8, wherein each of said downstream humidity sensor and said upstream humidity sensor includes a sensor element exposed to the exhaust gases for detecting the humidity of the exhaust gases, and
   said detector further comprises:

a heater for heating said sensor element of at least one of said downstream humidity sensor and said upstream humidity sensor;

operating state detecting means for detecting an operating state of said internal combustion engine; and heater control means for controlling an operation of said heater in accordance with the operating state detected by said operating sate detecting means.

* * * * *